(12) United States Patent
Fisher et al.

(10) Patent No.: US 10,268,276 B2
(45) Date of Patent: Apr. 23, 2019

(54) AUTONOMOUS COMPUTING AND TELECOMMUNICATIONS HEAD-UP DISPLAYS GLASSES

(71) Applicant: eyeCam, LLC, San Francisco, CA (US)

(72) Inventors: Ronald Fisher, San Franciso, CA (US); Bryan Davis, San Francisco, CA (US); James Fisher, San Francisco, CA (US); Andrew Merit, San Francisco, CA (US); Paul Gautreaux, Dallas, TX (US)

(73) Assignee: EYECAM, LLC, San Francisco, CA (US)

( * ) Notice: Subject to any disclaimer, the term of this patent is extended or adjusted under 35 U.S.C. 154(b) by 0 days.

(21) Appl. No.: 14/777,515

(22) PCT Filed: Mar. 15, 2014

(86) PCT No.: PCT/US2014/029882
§ 371 (c)(1),
(2) Date: Sep. 15, 2015

(87) PCT Pub. No.: WO2014/145166
PCT Pub. Date: Sep. 18, 2014

(65) Prior Publication Data
US 2016/0299569 A1    Oct. 13, 2016

Related U.S. Application Data

(60) Provisional application No. 61/852,325, filed on Mar. 15, 2013.

(51) Int. Cl.
*G06F 3/01* (2006.01)
*G02B 27/01* (2006.01)
(Continued)

(52) U.S. Cl.
CPC .......... *G06F 3/017* (2013.01); *G02B 27/017* (2013.01); *G02B 27/0172* (2013.01);
(Continued)

(58) Field of Classification Search
CPC ...................................................... G06F 3/013
See application file for complete search history.

(56) References Cited

U.S. PATENT DOCUMENTS

| 4,659,197 A | 4/1987 | Weinblatt |
| 4,796,987 A | 1/1989 | Linden |
(Continued)

FOREIGN PATENT DOCUMENTS

WO    2014145166 A2    9/2014

OTHER PUBLICATIONS

International Search Report and Written Opinion dated Oct. 31, 2014 in PCT/US14/29882, 19 pages.
(Continued)

*Primary Examiner* — Dorothy Harris
(74) *Attorney, Agent, or Firm* — Franklin & Associates International Inc; Matthew Lambrinos

(57) ABSTRACT

A pair of eyeglasses (100) has a frame (104) and lenses (102) mounted on the frame. A computer processor (130) is mounted on eyeglasses together with a plurality of cameras (105) and a digital projection system. IR sensors and/or dual zoom cameras may also be mounted on the glasses (100) and configured to track the movement of the user's hand (800).

13 Claims, 25 Drawing Sheets

(51) Int. Cl.
  *G06F 3/042* (2006.01)
  *G06F 3/00* (2006.01)
  *G06F 3/0485* (2013.01)
  *G06F 3/0488* (2013.01)
  *H04N 5/232* (2006.01)
  *H04N 5/247* (2006.01)
  *G02C 11/00* (2006.01)

(52) U.S. Cl.
  CPC .......... *G02B 27/0179* (2013.01); *G02C 11/10* (2013.01); *G06F 3/005* (2013.01); *G06F 3/011* (2013.01); *G06F 3/012* (2013.01); *G06F 3/013* (2013.01); *G06F 3/014* (2013.01); *G06F 3/0426* (2013.01); *G06F 3/0485* (2013.01); *G06F 3/04886* (2013.01); *H04N 5/23238* (2013.01); *H04N 5/247* (2013.01); *G02B 2027/014* (2013.01); *G02B 2027/0138* (2013.01); *G02B 2027/0178* (2013.01); *G02B 2027/0187* (2013.01)

(56) References Cited

U.S. PATENT DOCUMENTS

| | | | | |
|---|---|---|---|---|
| 5,742,263 | A * | 4/1998 | Wang | G02B 27/017 345/7 |
| 5,991,085 | A * | 11/1999 | Rallison | G02B 27/017 345/8 |
| 6,292,213 | B1 | 9/2001 | Jones | |
| 6,369,952 | B1 | 4/2002 | Rallison | |
| 6,769,767 | B2 | 8/2004 | Swab et al. | |
| 7,484,847 | B2 * | 2/2009 | Fuziak, Jr. | G02B 27/0172 345/7 |
| 7,542,665 | B2 | 6/2009 | Lei | |
| 7,648,236 | B1 | 1/2010 | Dobson | |
| 8,184,068 | B1 * | 5/2012 | Rhodes | G02B 27/017 345/7 |
| 9,658,473 | B2 * | 5/2017 | Lewis | G02C 7/101 |
| 9,851,803 | B2 | 12/2017 | Fisher et al. | |
| 2002/0094845 | A1 | 7/2002 | Inasaka | |
| 2005/0136949 | A1 | 6/2005 | Barnes, Jr. | |
| 2007/0118426 | A1 | 5/2007 | Barnes, Jr. | |
| 2007/0173266 | A1 | 7/2007 | Barnes, Jr. | |
| 2007/0248238 | A1 * | 10/2007 | Abreu | G02C 3/003 381/381 |
| 2009/0109292 | A1 | 4/2009 | Ennis | |
| 2009/0189981 | A1 | 7/2009 | Siann et al. | |
| 2009/0251661 | A1 | 10/2009 | Fuziak | |
| 2009/0262205 | A1 | 10/2009 | Smith | |
| 2009/0323975 | A1 | 12/2009 | Groesch | |
| 2010/0039493 | A1 | 2/2010 | Chao et al. | |
| 2010/0080418 | A1 * | 4/2010 | Ito | G06K 9/00228 382/103 |
| 2010/0110368 | A1 * | 5/2010 | Chaum | G02B 27/017 351/158 |
| 2010/0240988 | A1 * | 9/2010 | Varga | G02B 27/017 600/425 |
| 2010/0245585 | A1 | 9/2010 | Fisher et al. | |
| 2011/0213664 | A1 | 9/2011 | Osterhout | |
| 2011/0270522 | A1 | 11/2011 | Fink | |
| 2012/0127284 | A1 | 5/2012 | Bar-Zeev et al. | |
| 2012/0194418 | A1 | 8/2012 | Osterhout | |
| 2012/0249741 | A1 * | 10/2012 | MacIocci | G06F 3/011 348/46 |
| 2013/0033610 | A1 * | 2/2013 | Osborn | H04N 5/2258 348/207.1 |
| 2013/0141419 | A1 * | 6/2013 | Mount | G06F 3/011 345/419 |
| 2013/0208234 | A1 * | 8/2013 | Lewis | G06F 3/011 351/158 |
| 2013/0215281 | A1 * | 8/2013 | Hobby | G06F 3/005 348/207.1 |
| 2014/0050485 | A1 * | 2/2014 | Masarik | H04B 10/22 398/117 |
| 2014/0063055 | A1 * | 3/2014 | Osterhout | G06F 3/005 345/633 |
| 2014/0266988 | A1 | 9/2014 | Fisher et al. | |
| 2014/0267458 | A1 | 9/2014 | Fisher et al. | |
| 2014/0269425 | A1 | 9/2014 | Fisher et al. | |
| 2015/0301338 | A1 * | 10/2015 | Van Heugten | G02C 7/04 345/8 |

OTHER PUBLICATIONS

U.S. Non-Final Office Action dated Oct. 6, 2015 issued on U.S. Appl. No. 14/214,673 entitled Autonomous computing and telecommunications head-up displays glasses to eyeCam, LLC.

U.S. Final Office Action dated Jul. 13, 2016 issued on U.S. Appl. No. 14/214,673 entitled Autonomous computing and telecommunications head-up displays glasses to eyeCam, LLC.

* cited by examiner

AUTONOMOUS COMPUTING AND TELECOMMUNICATIONS HEAD-UP DISPLAYS GLASSES

CROSS REFERENCE TO RELATED APPLICATIONS

This application claims the benefit under 35 U.S.C § 119(e) of U.S provisional patent application No. 61/852,325, which was filed on Mar. 15, 2013 and which is incorporated here by reference in its entirety to provide continuity of disclosure.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

STATEMENT REGARDING FEDERAL RIGHTS

N/A

BACKGROUND

Field of Invention

This invention pertains to the fields of mobile wearable computing and digital eyeglasses and telecommunications devices that incorporate various electronic features such as sensors, computer processors, data storage, battery powered cameras and audio-visual feedback mechanisms.

Related Art

The emerging product category of heads up display eyeglasses are gaining media exposure. These products typically incorporate a single forward-facing camera and a digital display positioned proximate to the eyeglass lens and off to one side so as to minimize the occlusion of the wearer's field of view.

SUMMARY OF THE INVENTION

According to one aspect, there is provided an apparatus which can comprise a pair of eyeglasses having a frame and lenses mounted on said frame; a computer processor mounted on said eyeglasses; a digital display mounted in one of said lenses and operably coupled to said processor; a plurality of digital cameras mounted on said eyeglasses and operably coupled to said processor; and a digital projection system mounted on said eyeglasses and operably coupled to said processor.

In one embodiment, Smart Eye Glasses have stereo digital cameras, stereo human-audio interface, directional microphones, eye-tracking sensors, and digital projection system ("Smart Glasses").

Purposes of the invention include enabling wearers of the device to use the autonomous computing and telecommunications glasses as primary phone, Internet to communicate wirelessly and to record and view live video feeds of their surroundings in the user's eyeglasses while interacting with these video feeds in a way that enables the wearer to be able to dynamically perform a variety of functions such as to automatically zoom in on objects of interest which are in the user's field of view or visible from one of the camera feeds and to communicate with said device using a variety of inputs such as eye movements, hand movements and finger gestures as well as voice commands and button selections.

The smart glasses can incorporate dual forward-facing cameras, enabling the camera to record wide angle and stereographic video or still image content. In addition, the smart glasses can incorporate side-facing and rear-facing cameras such that it is able to record a 360 degree surround video feed.

The cameras can incorporate electro magnetic, electrostatic or electromechanical-mechanical optical zoom capabilities as well as digital zoom capabilities. With infrared enabled active auto-zoom and autofocusing system. The IR sensor enables low light and night vision.

These cameras can also incorporate directional electromechanical gimbal mounts, allowing them to pitch and yaw for greater directional control, according to some embodiments.

The eyeglasses can be selectively transparent or partially transparent, or opaque, according to some embodiments. In addition to a heads-up OLED display or Pico-Project system Heads-up display data can be projected into the eyeglasses such that it is superimposed onto the real-world view that the wearer sees through the glasses or it can replace the real-world view if the glasses opacity is increased.

Dual inward-facing eye motion tracking sensors are integrated into the frame of the eyeglasses above the left and right eyes. These give the smart glasses the ability to track the wearer's eye movements as well as determine the wearer's distant point of focus. Eye tracking can be used to control a wide variety of device functions including the cameras' zoom functions and the integrated telecommunications functions. For example, the user can direct the device to scroll a surround video feed left or right, simply by looking left or right. Alternatively, in another mode, the edges and corners of the user's heads-up display glasses can be logically mapped to represent a bird's eye view of the surrounding scene. To instruct the smart glasses to display the video feed from the rear-facing cameras, the user can briefly look down, to display video from the right, the user looks to the right of the display and to display video from the front, the user looks up.

IR Sensor, IR Mapping, Auto Zoom Adequately Covered?

Gesture commands using one or both hands can be used to control the smart glasses various functions. For example, one hand can be held in front of the camera and views selected to be zoomed in or out of using finger gestures. Using the IR sensors and the dual zoom cameras the smart glasses are able to dynamically detect and adapt to this scenario, so that the zoom camera most proximate to the hand takes on the role of focusing on the hand while the other camera continues to feed video footage of the scene to the head-up display. In addition, the smart glasses are able to mask the user's hand(s) by detecting its position in front of the wearer and intelligently substituting video from the other camera to cover the arc of view obscured by the hand. The two cameras' video feeds can be automatically stitched together to provide a seamless wide angle or panoramic view of the scene without the hand appearing in it. Said video can be recorded or streamed live to the wearer's heads-up display.

The smart glasses can also incorporate multi-directional audio, as well as the ability to select and amplify audio from a specific target object or direction and to feed and store audio such that it can be associated with its associated zoom video. Both in playback and live streaming modes, the viewer can selectively focus on a particular subject area of the video and listen to the amplified sound recorded from that particular direction.

The wearer is able to optionally use head motion to activate the video scroll feature. The device is able to differentiate between when the user has turned his or her head and when he has turned his or her entire body to face a new direction. This can be done by detecting the orientation of the user's body or shoulders, using downward-facing cameras or IR sensors, according to some embodiments. To scroll in one direction using this mode, the user turns his or head in that direction and to pause the scrolling, the user turns his or her head back to the forward neutral position. The degree of head turn can control the speed of the scrolling action.

Audio Input Control

Gyroscopic Motion Sensors, Accelerometers, GPS wifi-mobile communications device, a digital audio driver for sending audio feedback to the wearer's ears, a battery, a computer processor, a power management unit, and a forward-facing cameras and camera driver. Integrated audio-visual logic component or driver, a user interface logic component or driver, a computer processor, a mini SD memory card for external data storage, etc.

In another embodiment, the smart glasses can incorporate retractable, cameras that are on bendable or omni-directional mounts, enabling the user to custom orient each of these cameras in his or her preferred directions. For example, for certain sports a user may wish to capture video from above and/or below the head's natural orientation. These retractable cameras can also be oriented to provide an improved view behind the head (particularly if the rear camera support is not being used) and also around the wearer's hair.

In addition, the device has the ability to wirelessly stream surround video and audio or stereoscopic video or selected video feeds from individual cameras to the heads-up-display of another wearer of the one of these devices. Said wireless communication can take place though various communications protocols and systems, including but not limited to WiFi, Bluetooth, mobile phone cellular networks, etc.

DETAILED DESCRIPTION OF PREFERRED EMBODIMENTS

Figure 1:
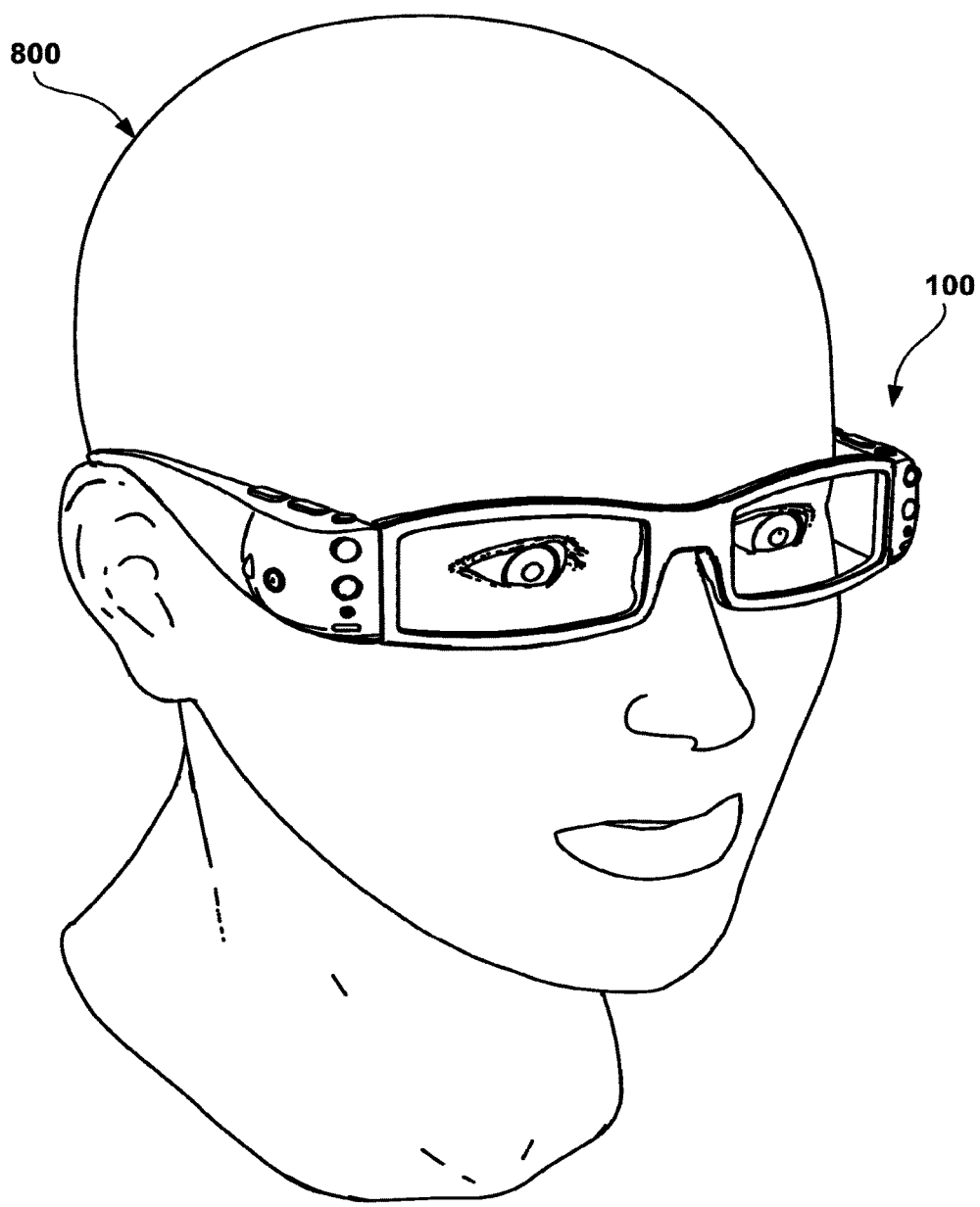
FIGS. 1 through 2C illustrate a pair of smart glasses according to one embodiment.

List of Reference Numerals
100—eyeVision
101—frame around eye lenses
102—eye lenses
103—eye direction-tracker cameras
104—eyevision arms (foldable, according to some embodiments)
105—forward-facing cameras
106—side facing cameras
107—rear angle facing cameras
108—IR light Imaging System
109—IR camera
110—control buttons on top
111—Microphones
112—Earphone (optionally detachable (bluetooth), or extendable via retractable cord, according to some embodiments)
113—data and charging port (allows for docking onto a docking station or attachment of corded plug).
114—Memory expansion slot. May follow a standard such as Micro SD flash memory or any future standard.
120—camera driver
122—power management
124—audio driver
126—wifi mobile
128—battery 130—processor
132—u/1 driver
134—a/v driver
136—mini sd card
156—
158—
200—attachable "ear loop" battery and earphone
201—optional data and power port for attaching the "neck loop" or for charging "ear loop".
300—Neck loop attachment
301—Rear-facing cameras
302—optional width extendability feature (for differing neck sizes)
303—optional rearward extendability feature
400—optional extendable position and direction adjustable cameras
401—hinge point/anchor point
402—optionally bendable or retractible extension arm
403—recess or channel for retracting extendable camera
500—camera phone
501—GPS satellite
502—Direct cellular connect/tower
503—WiFi hotspot/transmitter-receiver
601—distance to hand
602—distance from eye to lens
604—scanning using IR camera (pg 16, 17, 21, 23)
605—virtual grid overlaid on hand
606—phone dial keypad
608—virtual keyboard
609—virtual globe (or any 2D or 3D object)
610—dialing status display
650—eye focus target
652—scroll direction indicators
654—information/content (text, images, etc.)
700—pelican (distant subject)
701—clock in clock tower
720—room
722—virtual couch
800—eyeVision Wearer's head
801—eye
802—pupil (monitored for the purpose of tracking direction)
804—hands Several embodiments are specifically illustrated and/or described herein. However, it will be appreciated that modifications and variations are covered by the above teachings and within the scope of the appended claims without departing from the spirit and intended scope thereof.

Technical features described in this application can be used to construct various embodiments of autonomous computing and telecommunications eye glasses.

According to one aspect, there is provided autonomous computing and multi-channel telecommunications head-up displays glasses with dual POV optical zoom and autofocusing cameras, infra-red light and sensor array and side and rear view multi-directional lens array for 360 degree image and video.

In one approach, embodiments comprise Smart Eye Glasses with stereo digital cameras, stereo human-audio interface, directional microphones, eye-tracking sensors, and digital projection system ("Smart Glasses").

In one approach, purposes of the invention include enabling wearers of the device to use the autonomous computing and telecommunications glasses as primary phone, Internet to communicate wirelessly and to record and view live video feeds of their surroundings in the user's eyeglasses while interacting with these video feeds in a way that enables the wearer to be able to dynamically perform a variety of functions such as to automatically zoom in on objects of interest which are in the user's field of view or visible from one of the camera feeds and to communicate with said device using a variety of inputs such as eye movements, hand movements and finger gestures as well as voice commands and button selections.

According to some embodiments, the smart glasses can incorporate dual forward-facing cameras, enabling the camera to record wide angle and stereographic video or still image content. In addition, the smart glasses can incorporate side-facing and rear-facing cameras such that it is able to record a 360 degree surround video feed.

According to some embodiments, the cameras can incorporate electro magnetic, electro-static or electromechanical-mechanical optical zoom capabilities as well as digital zoom capabilities. With infrared enabled active auto-zoom and autofocusing system. The IR sensor enables low light and night vision. These cameras can also incorporate directional electro-mechanical gimbal mounts, allowing them to pitch and yaw for greater directional control, according to some embodiments.

The eyeglasses can be selectively transparent or partially transparent, or opaque, according to some embodiments. In addition to a heads-up OLED display or Pico-Project system Heads-up display data can be projected into the eyeglasses such that it is superimposed onto the real-world view that the wearer sees through the glasses or it can replace the real-world view if the glasses opacity is increased.

Dual inward-facing eye motion tracking sensors are integrated into the frame of the eyeglasses above the left and right eyes. These give the smart glasses the ability to track the wearer's eye movements as well as determine the wearer's distant point of focus. Eye tracking can be used to control a wide variety of device functions including the cameras' zoom functions and the integrated telecommunications functions. For example, the user can direct the device to scroll a surround video feed left or right, simply by looking left or right. Alternatively, in another mode, the edges and corners of the user's heads-up display glasses can be logically mapped to represent a bird's eye view of the surrounding scene. To instruct the smart glasses to display the video feed from the rear-facing cameras, the user can briefly look down, to display video from the right, the user looks to the right of the display and to display video from the front, the user looks up.

Gesture commands using one or both hands can be used to control the smart glasses various functions. For example, one hand can be held in front of the camera and views selected to be zoomed in or out of using finger gestures. Using the IR sensors and the dual zoom cameras the smart glasses are able to dynamically detect and adapt to this scenario, so that the zoom camera most proximate to the hand takes on the role of focusing on the hand while the other camera continues to feed video footage of the scene to the head-up display. In addition, the smart glasses are able to mask the user's hand(s) by detecting its position in front of the wearer and intelligently substituting video from the other camera to cover the arc of view obscured by the hand. The two cameras' video feeds can be automatically stitched together to provide a seamless wide angle or panoramic view of the scene without the hand appearing in it. Said video can be recorded or streamed live to the wearer's heads-up display.

The smart glasses can also incorporate multi-directional audio, as well as the ability to select and amplify audio from a specific target object or direction and to feed and store audio such that it can be associated with its associated zoom video. Both in playback and live streaming modes, the viewer can selectively focus on a particular subject area of the video and listen to the amplified sound recorded from that particular direction.

The wearer is able to optionally use head motion to activate the video scroll feature. The device is able to differentiate between when the user has turned his or her head and when he has turned his or her entire body to face a new direction. This can be done by detecting the orientation of the user's body or shoulders, using downward-facing cameras or IR sensors, according to some embodiments. To scroll in one direction using this mode, the user turns his or head in that direction and to pause the scrolling, the user turns his or her head back to the forward neutral position. The degree of head turn can control the speed of the scrolling action.

In some embodiments, the smart glasses have audio input control, gyroscopic motion sensors, accelerometers, GPS wifi-mobile communications device, a digital audio driver for sending audio feedback to the wearer's ears, a battery, a computer processor, a power management unit, and a forward-facing cameras and camera driver. Integrated audio-visual logic component or driver, a user interface logic component or driver, a computer processor, a mini SD memory card for external data storage, etc.

In another embodiment, the smart glasses can incorporate retractable, cameras that are on bendable or omni-directional mounts, enabling the user to custom orient each of these cameras in his or her preferred directions. For example, for certain sports a user may wish to capture video from above and/or below the head's natural orientation. These retractable cameras can also be oriented to provide an improved view behind the head (particularly if the rear camera support is not being used) and also around the wearer's hair.

In addition, the device has the ability to wirelessly stream surround video and audio or stereoscopic video or selected video feeds from individual cameras to the heads-up-display of another wearer of the one of these devices. Said wireless communication can take place though various communications protocols and systems, including but not limited to WiFi, Bluetooth, mobile phone cellular networks, etc.

Reference will now be made to the drawings in which the various elements of embodiments will be given numerical designations and in which embodiments will be discussed so as to enable one skilled in the art to make and use the invention.

Specific reference to components, process steps, and other elements are not intended to be limiting. Further, it is understood that like parts bear the same reference numerals, when referring to alternate figures. It will be further noted that the figures are schematic and provided for guidance to the skilled reader and are not necessarily drawn to scale. Rather, the various drawing scales, aspect ratios, and numbers of components shown in the figures may be purposely distorted to make certain features or relationships easier to understand.

Figure 2A:
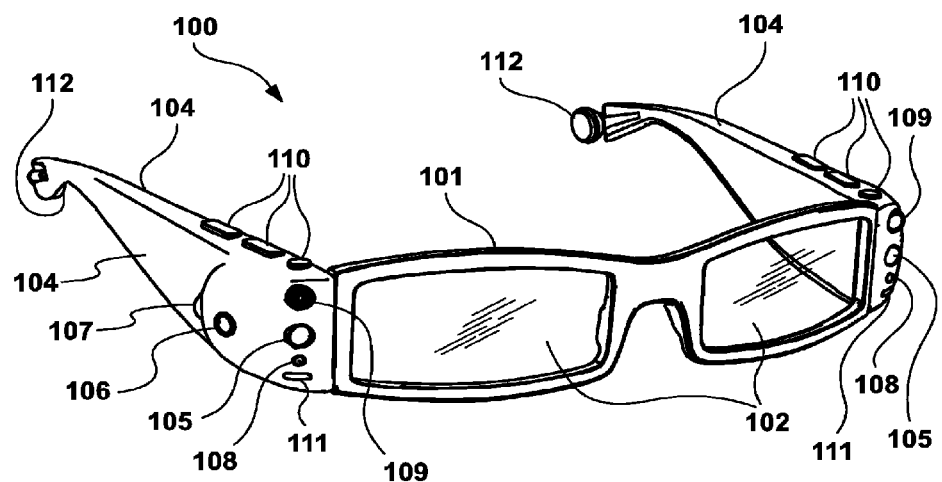
Figure 2B:
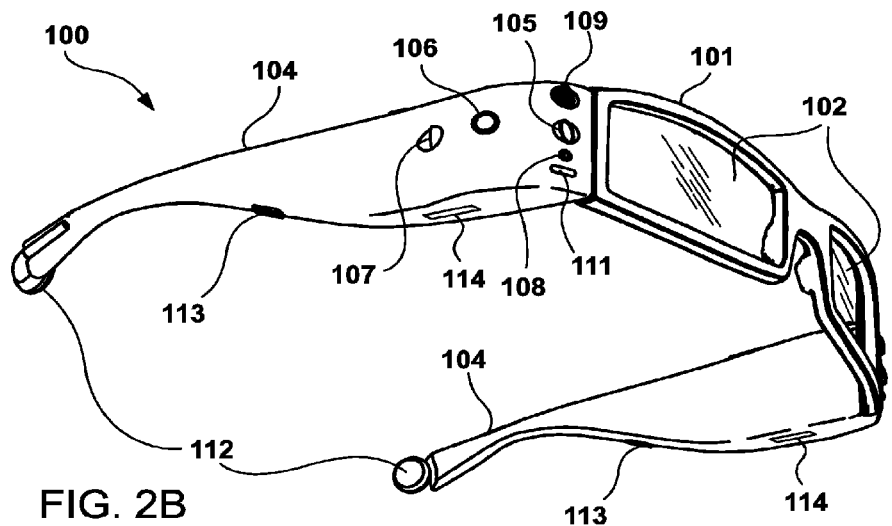
Figure 2C:
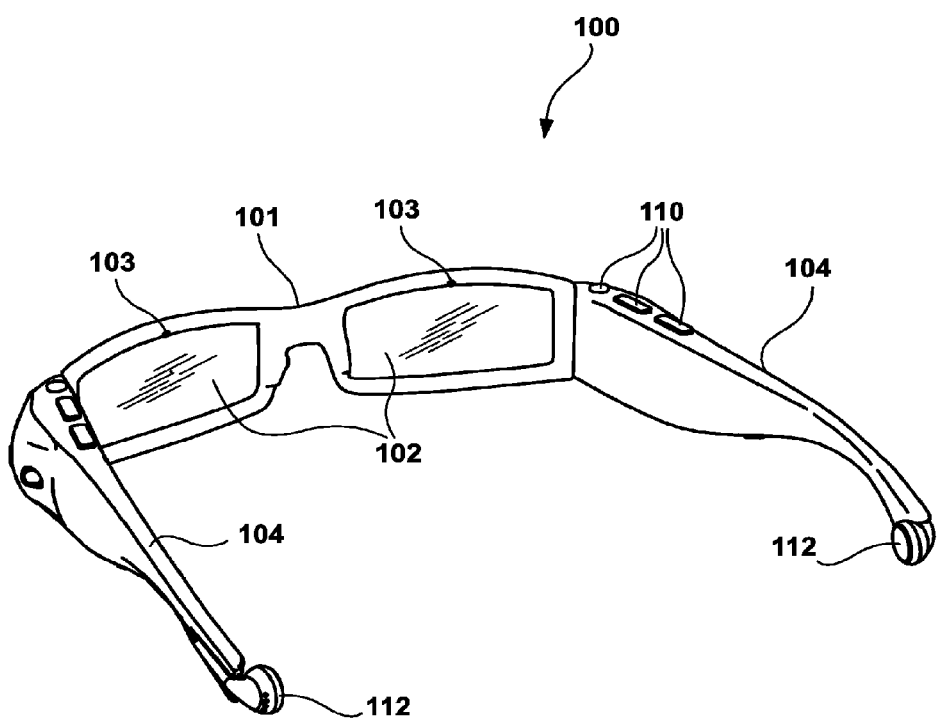

Reference will now be made to FIGS. 1 through 2C which illustrate a pair of smart glasses according to some embodiments. A pair of smart glasses 100 are shown on a human head 800. The smart glasses integrate dual forward-facing digital cameras 105 as well as digital optical cameras which face to the sides and the rear of the wearer. The smart glasses can incorporate digital displays 102 in the eyeglasses, which, according to some embodiments are able to function as head-up displays, allowing the wearer to see through said eyeglasses and or focus on digital content which can be displayed in the eyeglasses.

In addition there are detachable stereo wireless earphones 112, which can be stored in or on the glasses, according to some embodiments and inserted in the user's ears when needed. Said wireless earphones incorporate a power source (battery) and wireless communications electronics, such as a Bluetooth transceiver, which is able to communicate directly with similar communications electronics in the smart glasses, thereby allowing the smart glasses to transmit audio to the wearer's ears. In addition to the optical cameras, the front of each side of the smart glasses can incorporate an infra-red sensor and infra-red camera, according to some embodiments. The smart glasses also integrate eye tracking sensors 103 above each eye, so that the user is able to communicate with the smart glasses using eye movements and the smart glasses are able to continually monitor eye movement to determine the wearer's visual focus and point of interest and accordingly adapt its video feeds to on-board digital memory and to the wearer's display, according to some embodiments. Dual multi-directional microphones in each arm 104 are able to track and record sound in three dimensions. The ear phones 112 are able to reproduce three-dimensional surround sound so that the wearer is able to sense directionality related to video feeds that are projected in the eyeglass head-up-displays. Internal rechargeable batteries provide power to all of the integrated electronic components. The precise arrangement of the described electronic components can vary.

The smart glasses can also incorporate interface ports for charging the internal batteries as well as data download and upload. In addition, the arms 104 of the smart glasses can incorporate ports or slots 114 for the insertion of memory cards, such as SD cards. These interface ports and memory card slots 114 are depicted as integrated underneath each of the arms, according to some embodiments. Internal electronics and contacts integrated into the hinge areas between the arms and the eyeglass frame 101 provide for data communication and power feeds between the arms and the eyeglass frame.

Figure 3A:
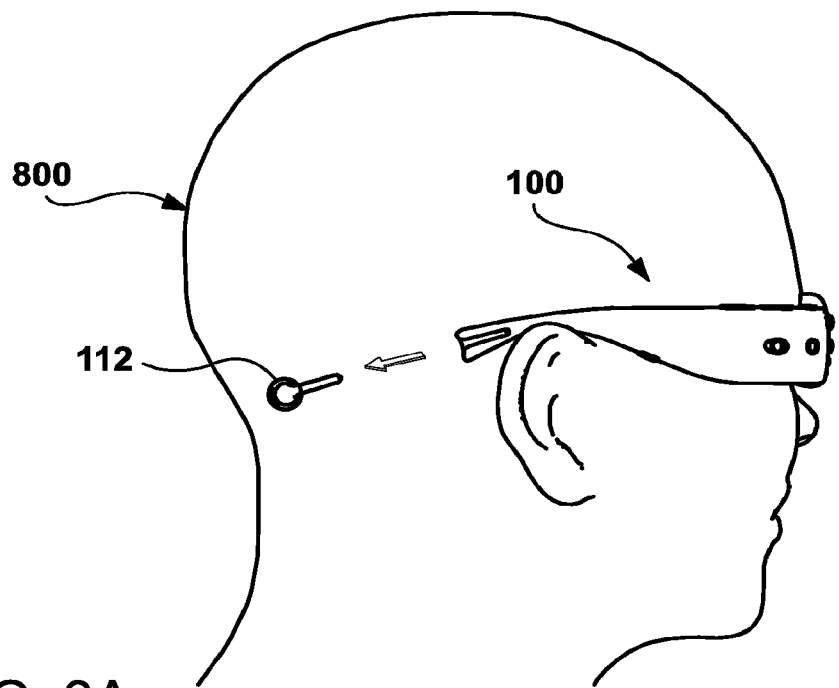
FIGS. 3A and 3B illustrate smart glasses including detachable wireless earphones according to some embodiments.
Figure 3B:
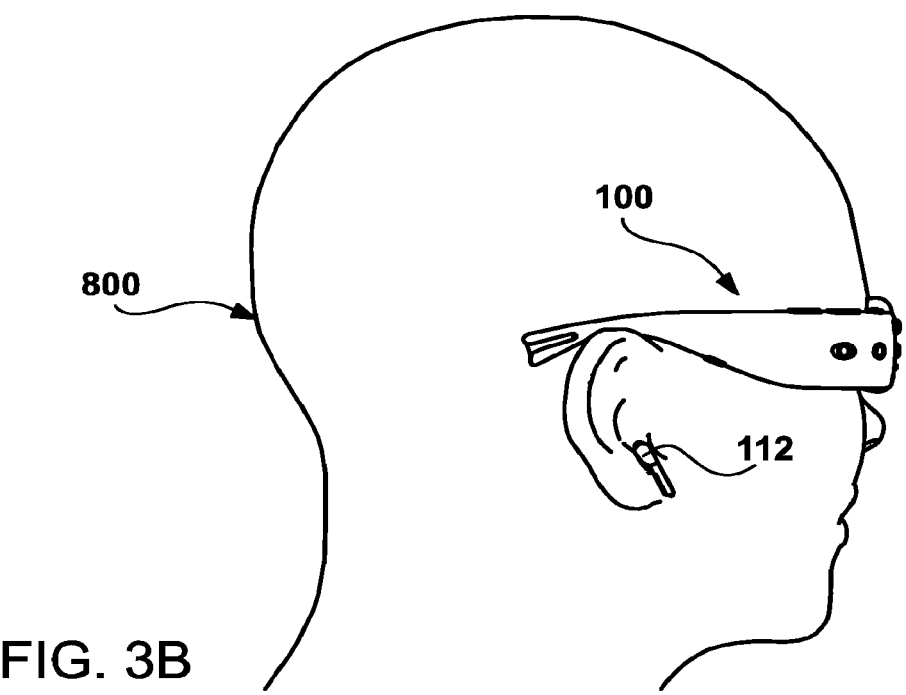

Referring now to FIGS. 3A and 3B, which illustrate smart glasses including detachable wireless earphones according to some embodiments, the figures illustrate how the wireless earphones 112 can be detached by the wearer from their docking-charging stations in the smart eyeglasses and then worn in the ears.

Figure 4A:
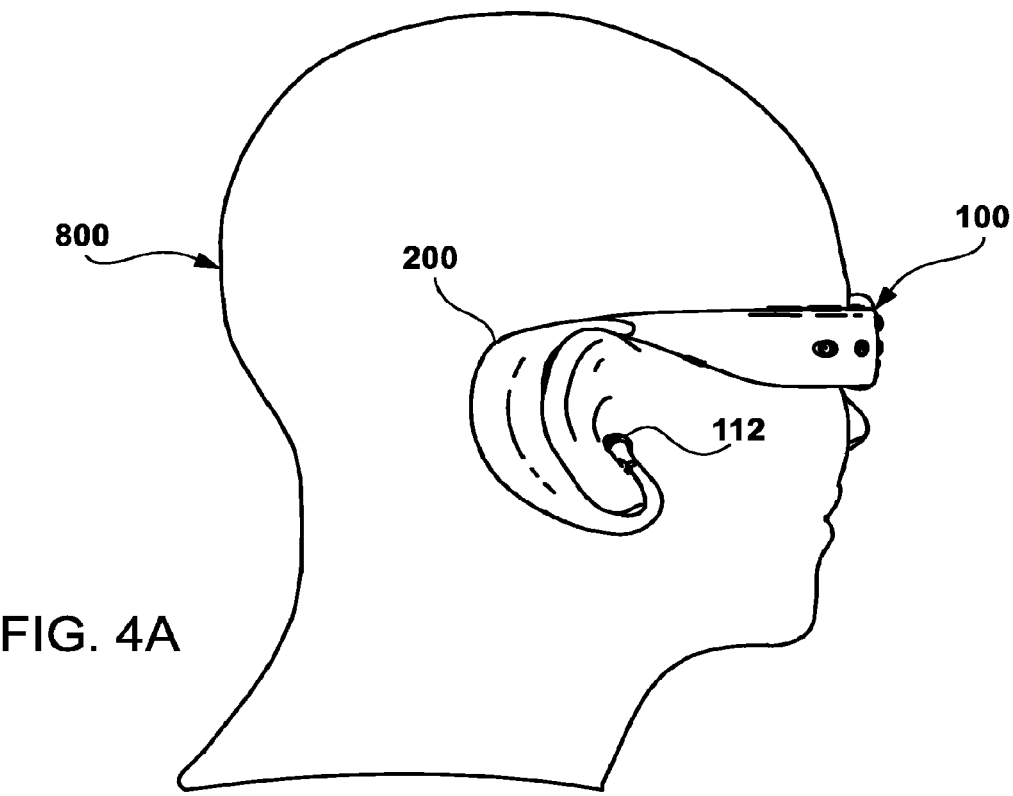
FIGS. 4A through 4B smart glasses including attachable external batteries according to some embodiments.
Figure 4B:
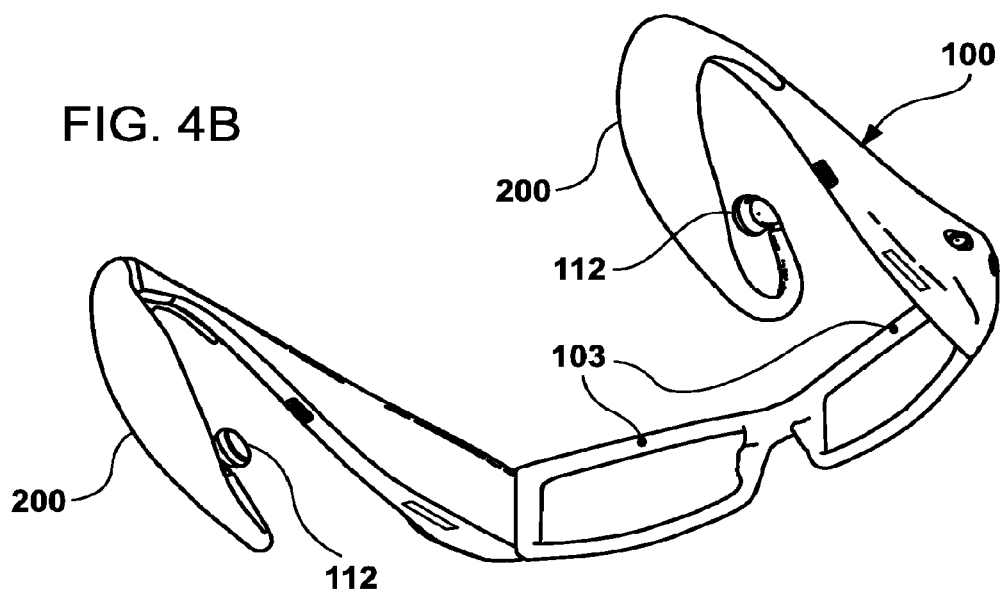

FIGS. 4A through 4B illustrate smart glasses including attachable external batteries according to some embodiments. As shown in FIGS. 4A through C, attachable external batteries 200 can attach to the arms 104 of the smart glasses, according to some embodiments. Said attachable external batteries can also support and power the detachable wireless earphones 112, according to some embodiments. These batteries 200 can also provide a electronic communications pass-through to the ear phones 112 so that transmission of audio data to them from the smart glasses 100 can be wired rather than wireless. Said external batteries 200 can use the same docking port that is used for storage and charging of the wireless earphones 112 to connect to the arms 104 of the smart glasses 100, according to some embodiments. The smart glasses 100 are able to intelligently and dynamically switch power sources, so that it will always deplete the external batteries 200 before depleting its internal batteries. In addition, the smart glasses 100 will automatically recharge the internal batteries 200 and the earphone batteries from the external batteries whenever they are connected.

Figure 5A:
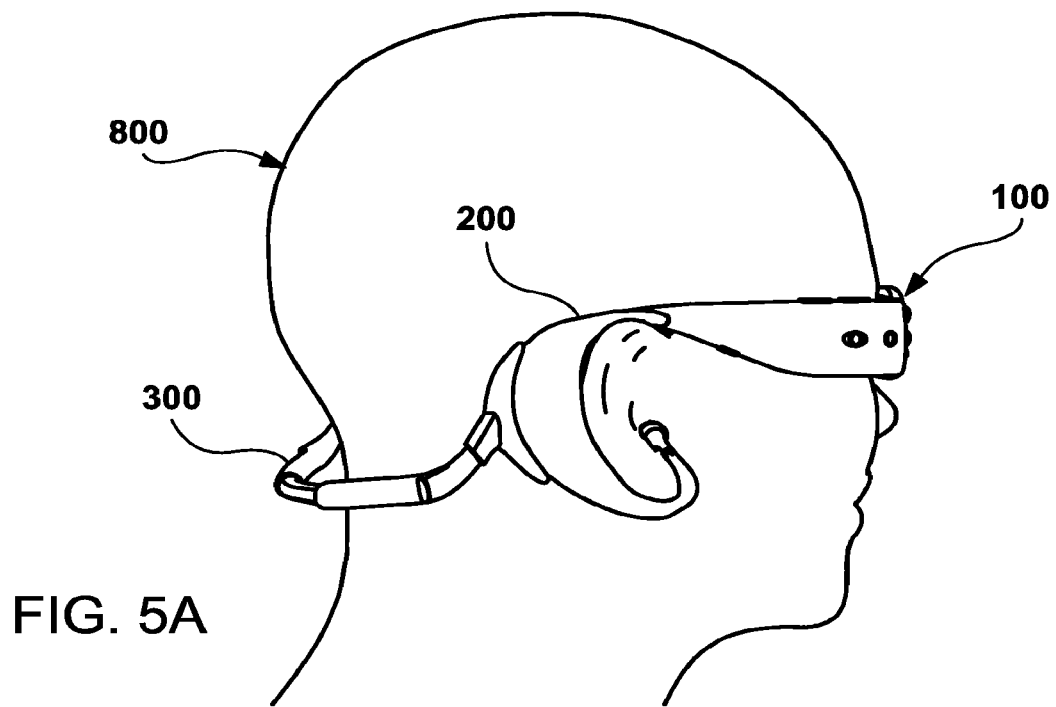
FIGS. 5A and B through 6A and B illustrate an attachable external rear camera support for the smart glasses according to some embodiments.
Figure 5B:
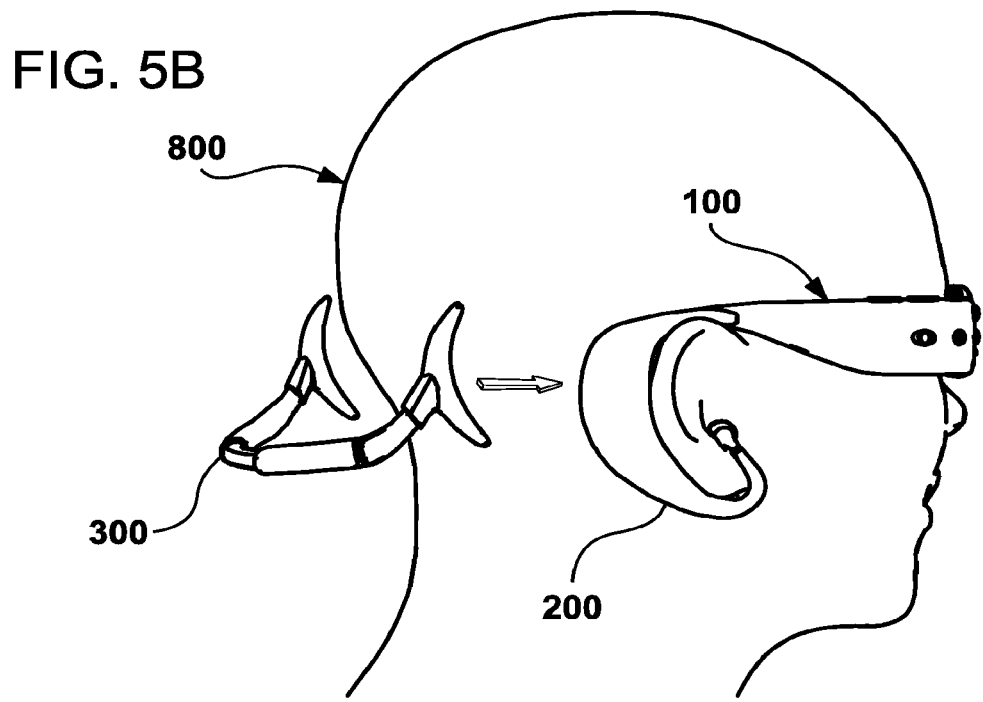
Figure 6A:
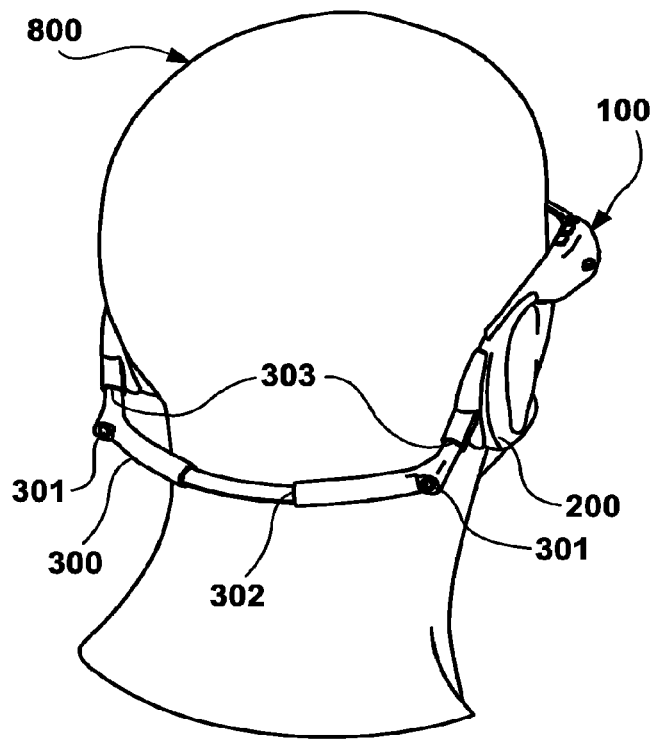
Figure 6B:
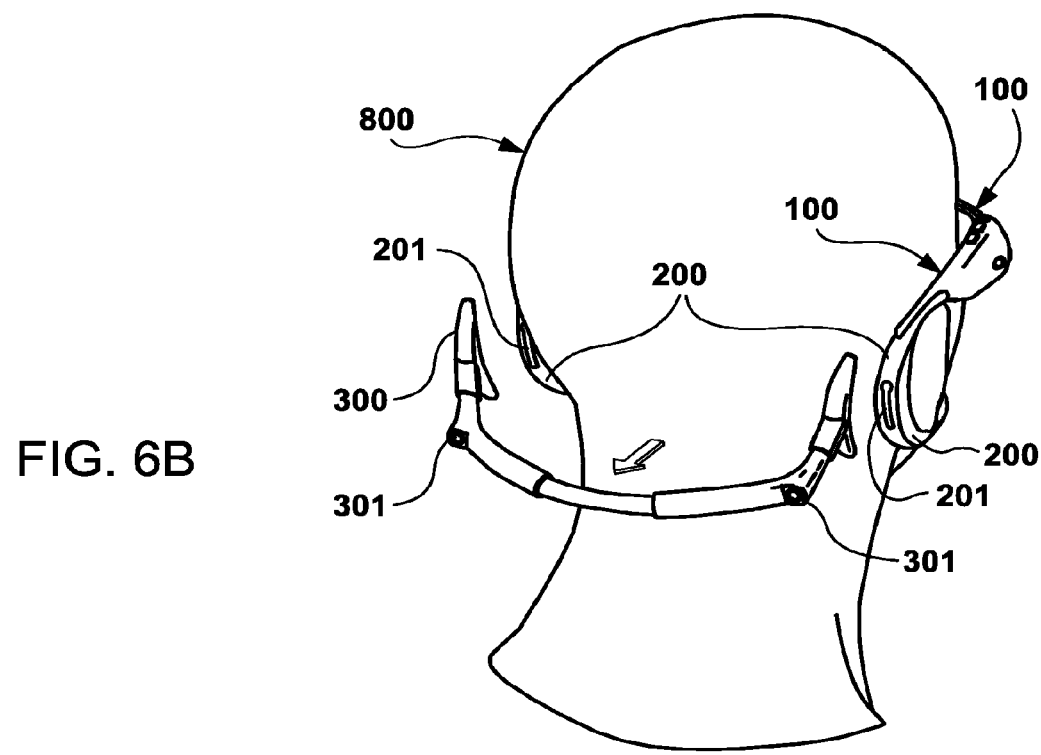

FIGS. 5A and B through 6A and B illustrate an attachable external rear camera support for the smart glasses according to some embodiments. As depicted in FIGS. 5A and B through 6A and B, the attachable external rear camera support 300 wraps behind the neck and provides additional support for the smart glasses 100 and to provide rear video feeds from its integrated stereo cameras. Said rear camera support allows the user to secure the smart glasses to his or her head for active use such as during sports and to also record full 360 degree panoramic video. Said rear camera support 300 can attach to the external batteries 200, as depicted, according to some embodiments. In other embodiments not depicted here, the rear camera support 300 can attach directly to the smart glasses 100 and can optionally incorporate its own internal battery. Said rear camera support 300 can be adjustable to allow for people of different size and shape to customize the fit. It can adjust out enough to wrap around hair of varying volume. In the depicted embodiments, sheaths 302 allow for the rear camera support 300 to be extended in its width, as well as to be extended out and down.

Figure 7A:
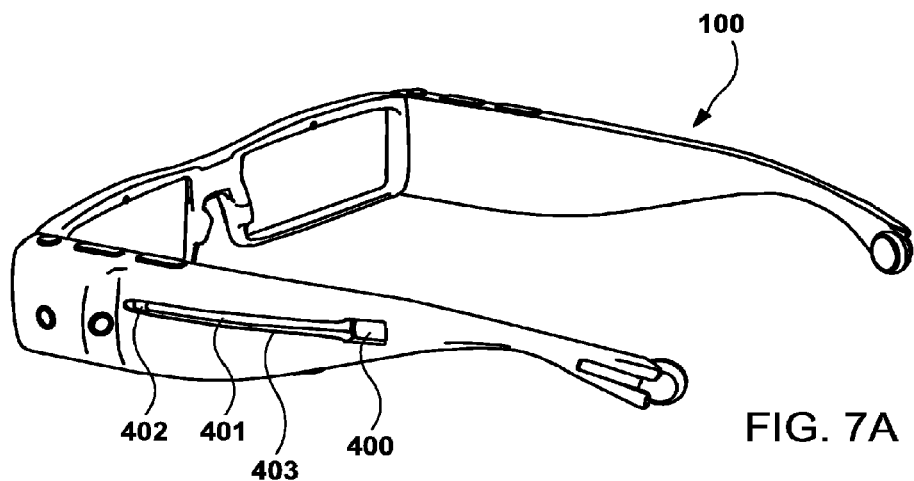
FIGS. 7A and B depict a pair of smart glasses according to some embodiments.
Figure 7B:
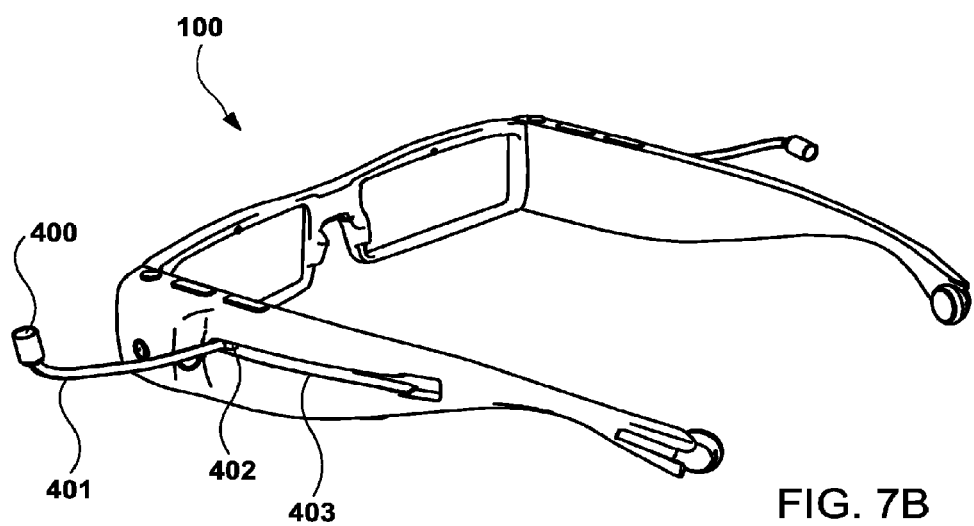

FIGS. 7A and B depict a pair of smart glasses according to some embodiments. As depicted in FIGS. 7A and B, a pair of smart glasses 100 in which the arms of the devices integrate extendable, cameras 400 that are on multi-directional bendable supports 401, according to some embodiments. In the depicted embodiment, these extendable cameras 400 are able to be stored inside recessed tracks 403 in the arms of the smart glasses 100 when not in use and can be swiveled out and bent into the desired orientation as desired.

Figure 8A:
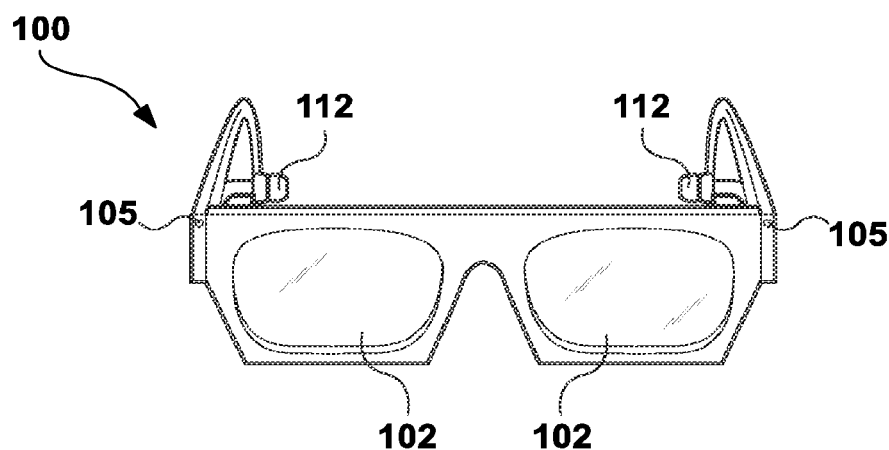
FIGS. 8A and 8B depict alternative embodiments of the smart glasses.
Figure 8B:
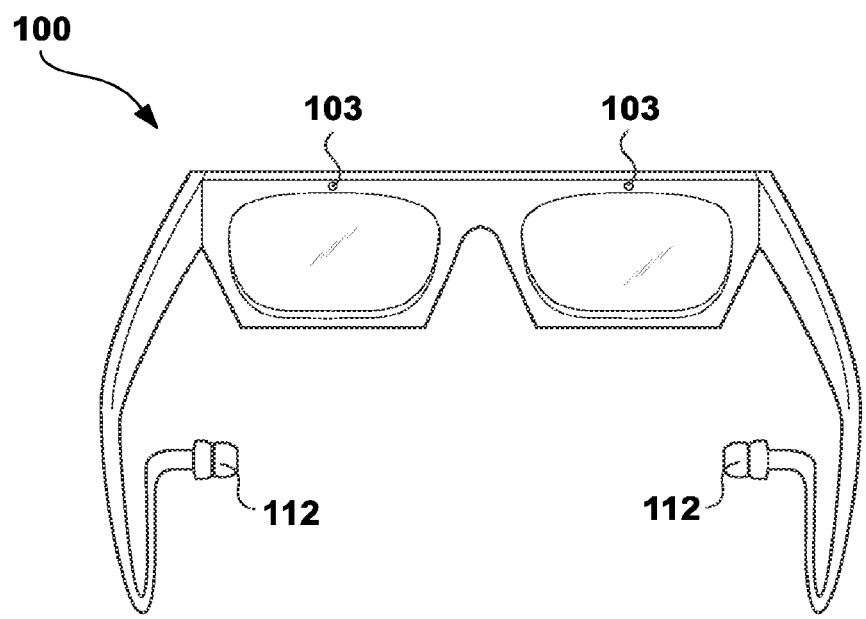

FIGS. 8A and 8B depict simplified embodiments of the smart glasses according to some embodiments. FIGS. 8A and 8B emphasize the head-up display eyeglasses and the optical motion sensors as well as the integrated earphones, according to some embodiments. In this particular embodiment, the earphones are connected to the arms of the smart glasses. These may also be separable and/or wired or wireless, as depicted in earlier figures. FIG. 8A is a front perspective view of the smart glasses (100) dual POV optical and digital zoom cameras (105) with left and right earpiece microphone and speaker and binocular heads-up display glasses with varying transparency left and right lenses (102) for augmented and virtual reality vision. FIG. 8B is a rear perspective view of the smart glasses (100) left and right eye monitoring cameras (103) for iris scanning (802) user identification and monitoring the position and point of focus (650) of the eyes (801) in order to coordinate eye movements and focus (650) with the camera auto zoom and focusing system (105) and control the eye and facial motion interfacing system for multi-directional display scrolling (652) and hands-free interfacing and left and right earpieces microphones and speakers (112) for stereo sound and noise cancelation, voice command, audio recording and communications.

Figure 9A:
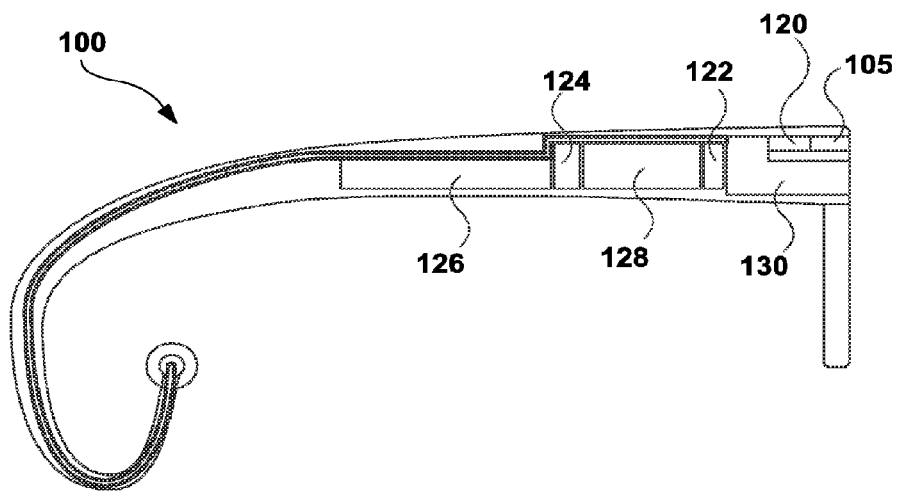
FIGS. 9A and 9B illustrate right and left internal side views respectively of the smart glasses according to some embodiments.
Figure 9B:
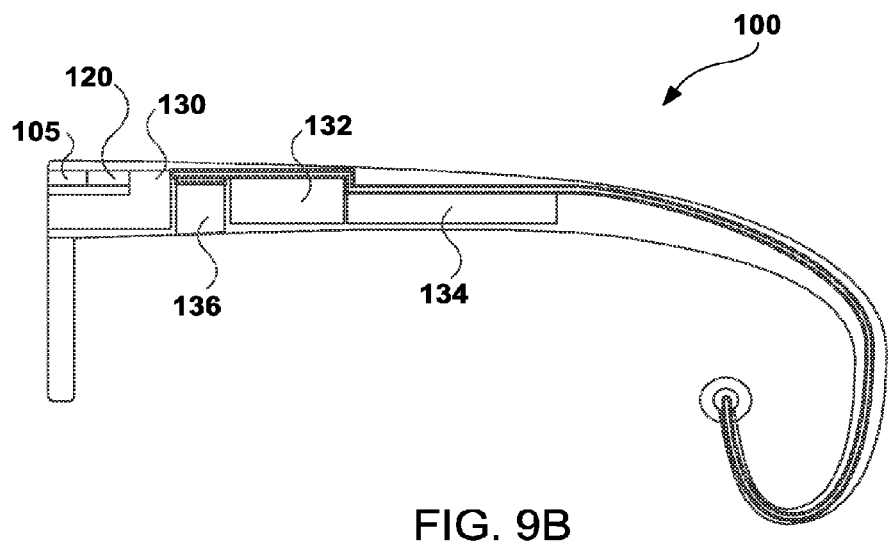

FIGS. 9A and 9B illustrate right and left internal side views respectively of the smart glasses according to some embodiments. Internal electronic components integrated into the arms of the glasses are symbolized. The precise arrangement of said electronic components can vary. In the depicted embodiment in FIG. 9A, the right eyeglass arm can be seen with a wifi-mobile communications device 126, a digital audio driver 124 for sending audio feedback to the wearer's ears, a battery 128, a computer processor 130, a power management unit 122, and a forward-facing camera 105 and camera driver 120. In FIG. 9B, the left eyeglasses arm can be seen with integrated audio-visual logic component or driver 134, a user interface logic component or driver 132, a computer processor 130, a mini SD memory card 136 for external data storage, and a camera 105 and camera driver 120.

Figure 10A:
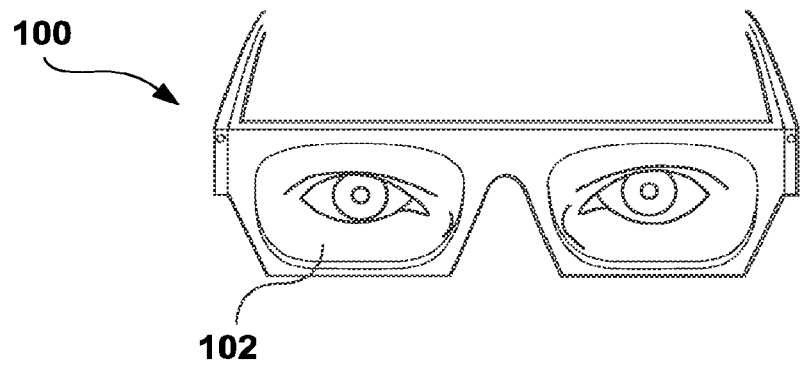
FIG. 10A depicts a frontal perspective view of the heads-up display glasses according to some embodiments.
Figure 10B:
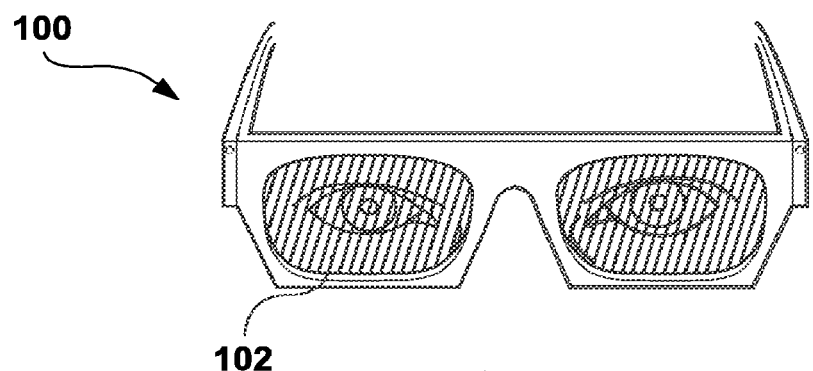
FIG. 10B depicts a frontal perspective view of the heads-up display eyeglasses according to some embodiments.
Figure 10C:
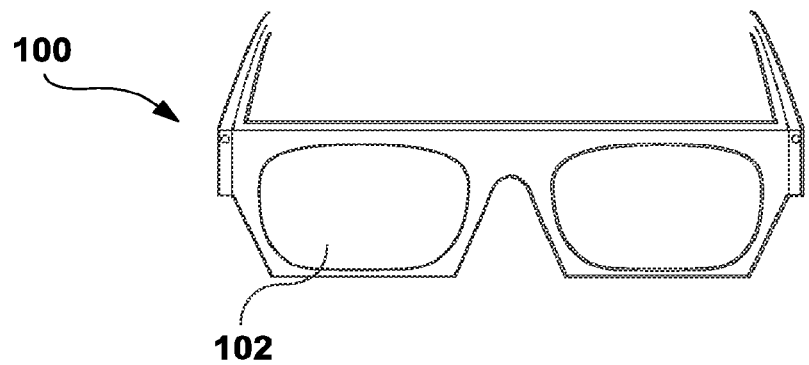
FIG. 10C depicts a frontal perspective view of the heads-up display eyeglasses according to some embodiments.

FIGS. 10A-10C are front perspective views of the smart glasses (101) according to some embodiments illustrating left and right lens displays (102) adjustable transparency enabling varying levels of see through augmented imaging to full virtual reality display.

FIG. 10A is a front perspective view illustrating a fully transparent see through augmented reality display. In FIG. 10A, the glasses 100 are shown in their fully transparent state, allowing the wearer an unobstructed view of the real world.

FIG. 10B is a front perspective view of the smart glasses illustrating a semi transparent display enabling see through vision of outside world and more vivid augmented reality and virtual reality imaging. In FIG. 10B, the glasses are shown in a translucent or partially opaque state. The heads-up display glasses are able to display video or computer-generated content such that it is translucent, providing the user with the ability to monitor the real world in front of him or her. In addition, the opacity of the lenses 102 can be dynamically altered based on ambient lighting conditions or to filter direct sunlight.

FIG. 10C is a front perspective view of the smart glasses illustrating left and right lenses in fully opaque mode where the wearer is unable to see through the lenses and both lenses operate as virtual reality screens for experiencing a heads-up 3D video gaming environment, wide screen high definition and 3D videos or for augmenting the external environment captured in 3D by the left and right optical and digital zoom cameras (105) and augmenting the real world into a virtual environment by using the left and right lenses (102) as real-time video monitors for the left and right optical and digital zoom cameras (105) enabling the wearer to naturally zoom and focus on remote objects augmenting the users vision. In FIG. 10C, the glasses are in an opaque or mostly opaque state, for optimal viewing of heads-up display imagery.

FIGS. 11A-11D are perspective views of the smart glasses illustrating the eye and facial monitoring system according to some embodiments. The internal left and right eye monitoring cameras (103) scan the iris (802) for user identification and continuously monitor the position of the eyes (801) and their point of focus (650) in relation to the X and Y coordinates of the left and right lens displays (102) in order to identify the users point of focus (650) and enable the user to control a virtual interface on the glasses displays (102).

Figure 11A:
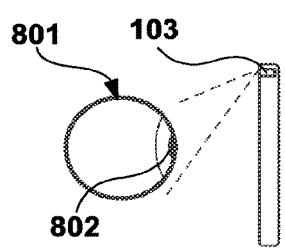
FIGS. 11A through 11D depicts the eye and facial monitoring system with and without smart glasses according to some embodiments.
Figure 11B:
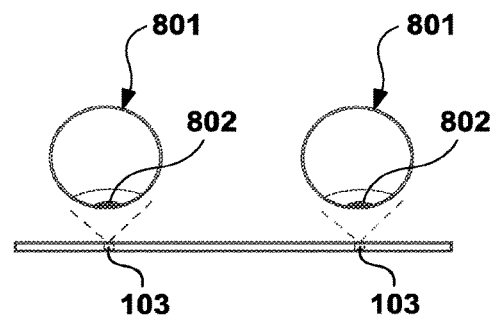
Figure 11C:
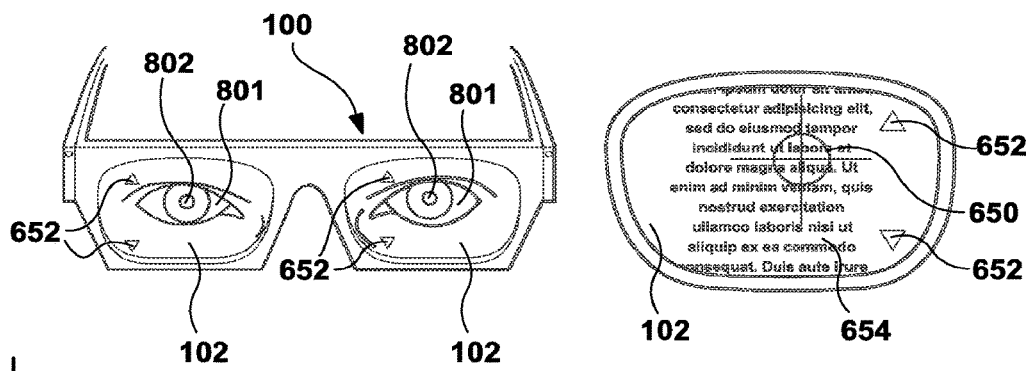
Figure 11D:
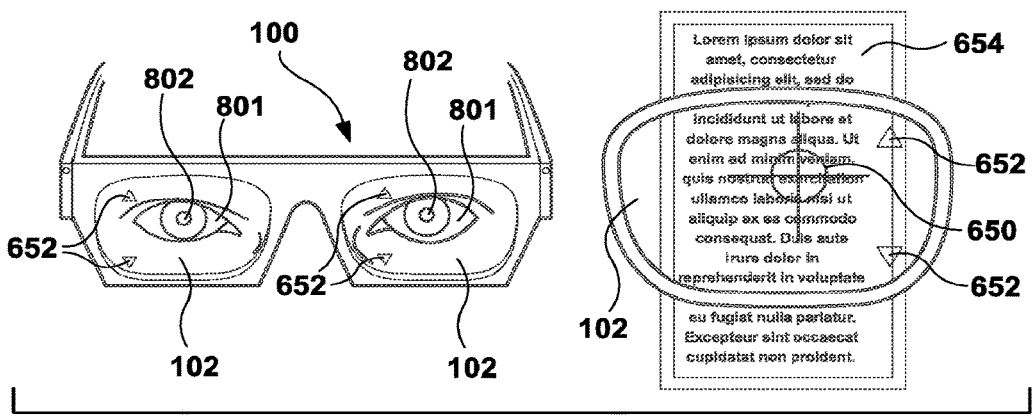

FIG. 11A is a side perspective view of an eye (801) and the eye-monitoring camera (103) on the smart glasses. FIG. 11B is an overhead perspective view of left and right eyes (801) and left and right eye monitoring cameras (103) on the smart glasses (100). FIG. 11C is a perspective view of the users eyes (801) through the smart glasses (100) lens displays (102) in transparent mode illustrating a user reading an augmented display (156) in the smart glasses lenses (102). The accompanying perspective view of a single lens display identifies the eyes point of focus (650) on the lens display (102) and the up and down eye motion interface scrolling option (652) for the displayed content. FIG. 11D is a perspective view of the users eyes (801) through the smart glasses (100) where the user is reading a physical printed document (158) through the smart glasses lenses (102) the glasses are able to identify the point of focus (650) on the physical document and the POV cameras (105) are able to autonomously zoom and focus to optimize the view of the document (158) based on point of focus similar to the eyes natural focusing process.

FIGS. 11A to 11D show how eye tracking sensor 103 can be used to enable the user to give instructions or cues to the smart glasses' internal computer processor so that it can act on said cues and accordingly perform pre-programmed functions. In the depictions, using the eye-tracking sensors 103, the smart glasses are able to track where on the screen the eyes 801,802 are focused both on the vertical and horizontal axes. In this way it is able to, for example, detect when the wearer has read toward the bottom of a page and automatically scroll the content up. Likewise, the user is able to scroll the page down by looking toward the top of the screen. For wide images, the user can similarly look toward the left or right of the screen and the display content will automatically scroll across to the right or left, respectively.

Figure 12A:
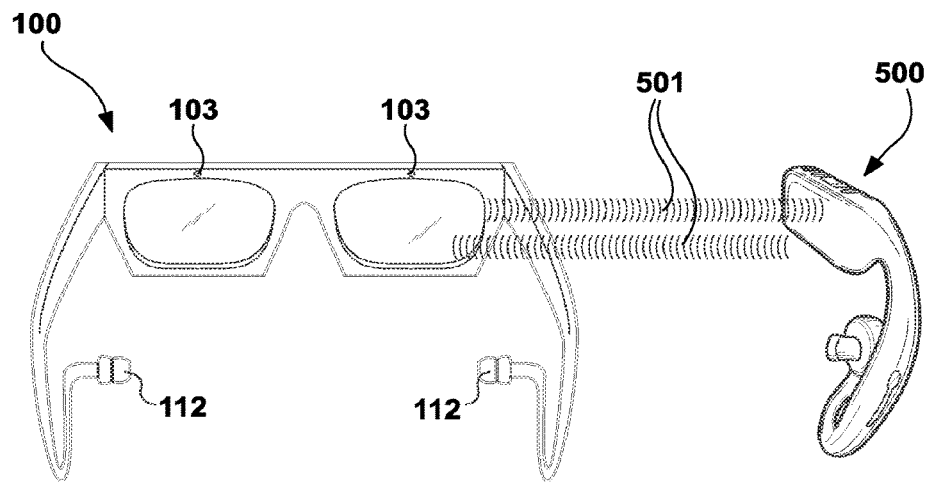
FIGS. 12A and 12B depict wireless communication between the smart glasses and a head-mounted camera or camera-phone according to some embodiments.
Figure 12B:
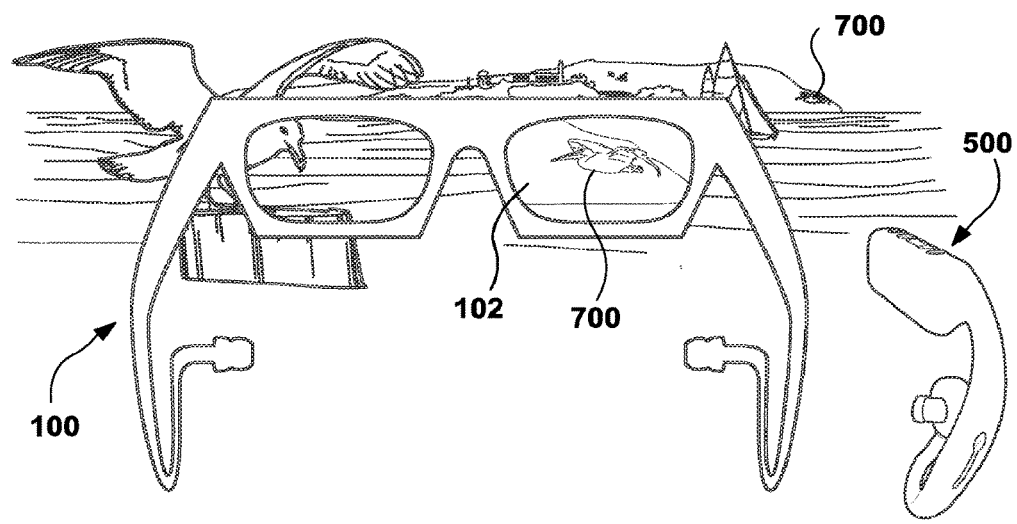

FIGS. 12A and 12B depict wireless communication between the smart glasses and a head-mounted camera or camera-phone according to some embodiments.

FIG. 12A is a perspective rear view of the smart glasses (100) wirelessly pairing with a telecommunications headset (500) and external POV camera according to some embodiments. Capable of augmenting the smart glasses cameras (105) and expanding the devices functionality. FIG. 12B is a perspective rear view of the smart glasses (100) wirelessly paired with a telecommunications headset (500) where the view in each of the lenses (102) illustrates a different depth of field and point of focus. The left lens display illustrates a natural view of the users field of view while the right display illustrates an augmented view of a bird (700) in the distance. The glasses are able to capture two depths of field and points of focus simultaneously and augment the two depths of field into a 2D or 3D binocular display. This can be accomplished using the glasses two onboard optical and digital zoom autofocusing cameras (105) and/or augmenting additional views from external cameras.

The depicted head-mounted camera phone 500 is able to dock next to the eyeglasses 100. In this case, the smart glasses 100 would not require an earphone 112 since one is provided by the camera-phone 500. The camera-phone is able to wirelessly transmit its video feed to the smart glasses, which in turn can display the video content in the head-up display glasses, according to some embodiments. The wireless communication 501 can be two-way, so that the smart glasses 100 are able to transmit instructions to the camera-phone. 500 For example, tracking of eye movements can be used to instruct the camera-phone as what target object to zoom in and focus on.

Figure 13A:
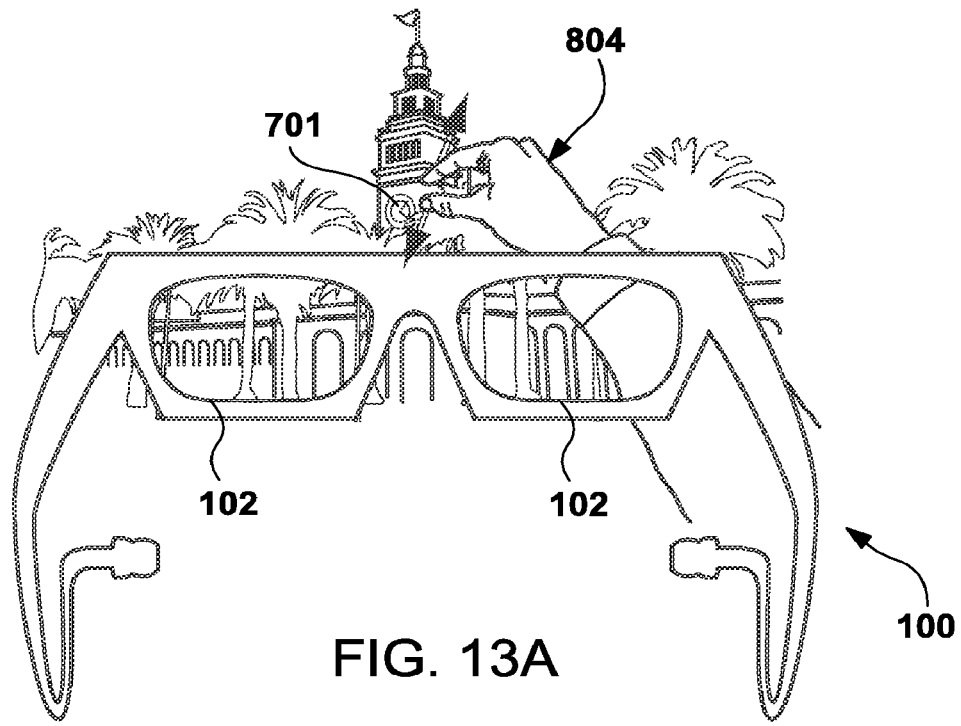
FIGS. 13A and 13B illustrate the smart glasses' ability to detect and track hand movements and gesture patterns according to some embodiments.
Figure 13B:
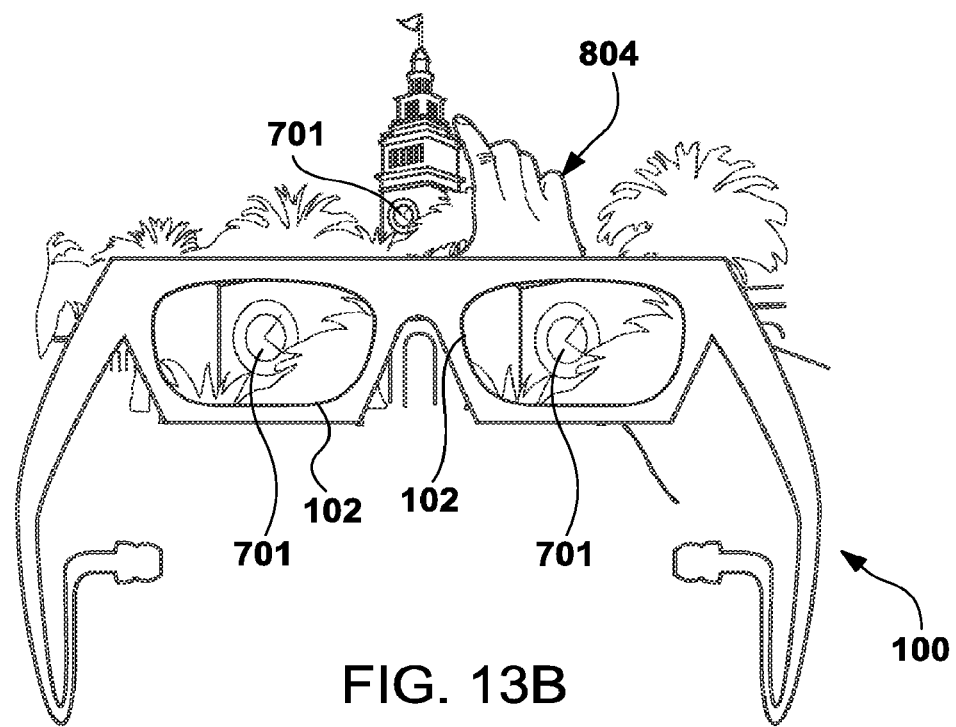

FIGS. 13A and 13B are rear perspective views of the smart glasses (100) according to some embodiments illustrating the IR hand (804) mapping and gesture interfacing function and the ability to augment the users field of view by using the left and right cameras (105) to zoom and focus on objects in the users field of view. In FIGS. 13A and 13B the user is able to manually control the cameras optical and digital zoom function using their hand (804) to identify the object or an area of interest in the users field of view and zoom in on that object or area (701).

FIG. 13A is a perspective rear view of the smart glasses (100) illustrating the wearer viewing a scene through the smart glasses lenses (102) and using their hand, thumb and forefinger (804) to select an area of interest (701) in the users field of view.

FIG. 13B is a perspective rear view of the smart glasses (100) illustrating the wearer viewing a scene through the smart glasses lenses (102) and using their hand, thumb and forefinger (804) to expand and zoom in on a an object or an area of interest (701) in the wearers field of view. The image displayed in the glasses (701) left and right lens displays (102) illustrates the cameras zoomed in view of the object (701) and area manually selected by the wearer. The wearer can then choose to take a still image of the selected view or continuously record or stream their viewing experience as a video.

The user is able to control the smart glasses functions by detecting and tracking the hand movements 804 and gesture patterns. In this depiction, the user has used a reverse-pinching gesture to isolate the clock 701 on a distant clock tower and zoom in on this target subject. The dual zoom cameras automatically zoom in on the clock and the heads-up display glasses display live video footage of the zoomed-in clock 701 so that the user can determine the time of day.

Figure 14:
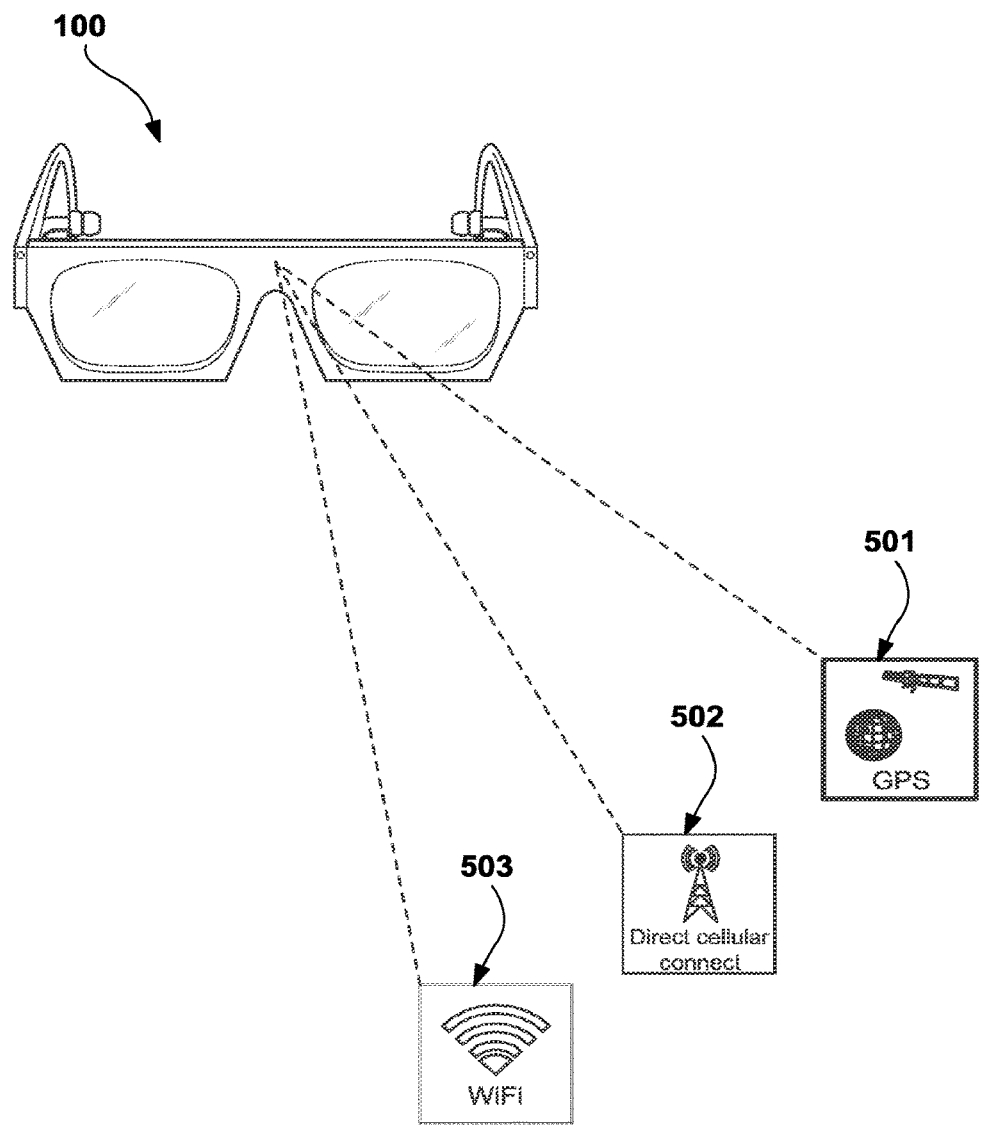
FIG. 14 depicts the ability of the smart glasses to wirelessly communicate with telecommunications networks using WiFi, mobile cellular connections, satellites and global positioning systems according to some embodiments.

FIG. 14 is a front perspective view of the smart glasses (100) according to some embodiments illustrating the different networking options available in the smart glasses. FIG. 14 depicts the ability of the smart glasses to wirelessly communicate with telecommunications networks using WiFi 503, mobile cellular connections 502, satellites and global positioning systems 501 according to some embodiments. The smart glasses (100) incorporate location (501) wide (502), local (503) and personal area networking options enabling the glasses to simultaneously engage in peer-to-peer networking or pairing with other modules and devices while connecting wirelessly to the Internet, calling and or instantly connecting with one or more wireless devices and streaming and receiving audio-video and location based data in real-time.

Figure 15A:
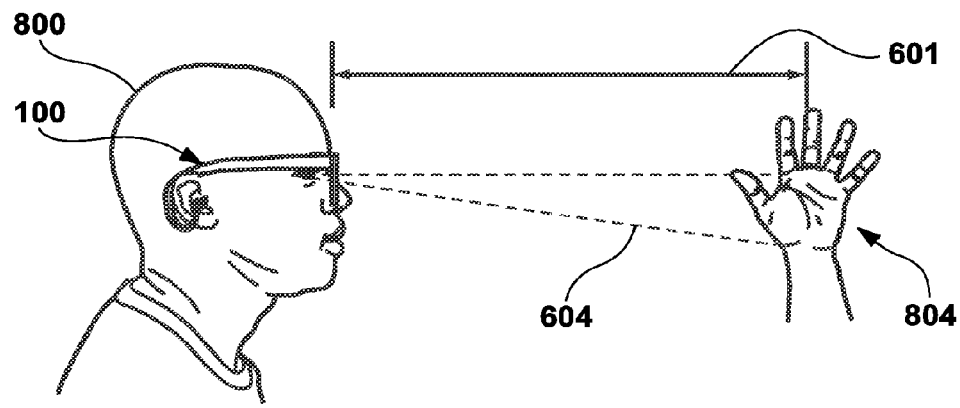
FIGS. 15A and 15B depict the ability of the smart glasses to measure distances according to some embodiments.
Figure 15B:
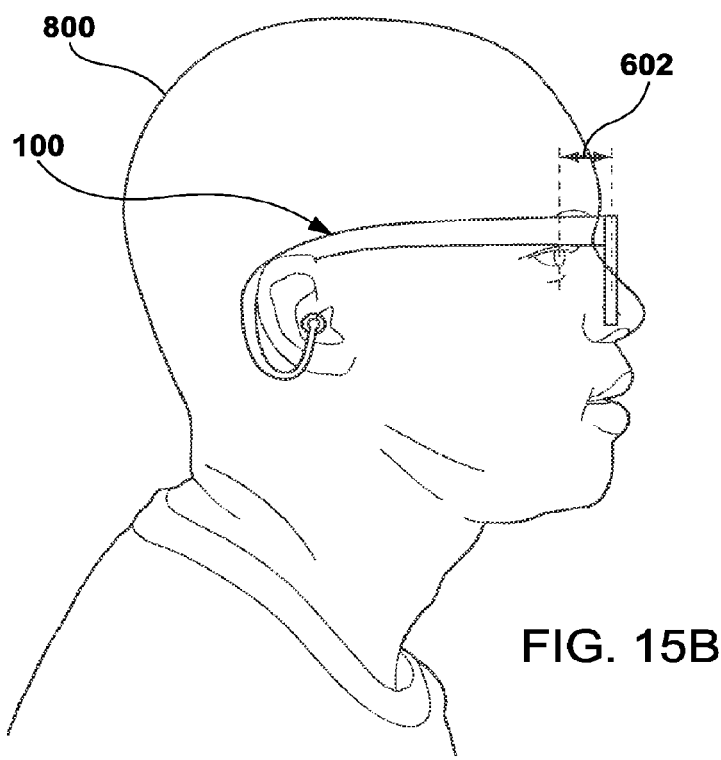

FIGS. 15A and 15B depict the ability of the smart glasses to measure distances 601,602,604 according to some embodiments. The smart glasses 100 are configured to measure remote objects using cameras and infra-red sensors and also measure the distance 604 between the head-up display glasses and the wearer's eyes. FIG. 15A is a side perspective view of the smart glasses (100) worn on a users head illustrating the process of the glasses mapping the distance (601) to the users hand (804) in the wearers field of view (604).

FIG. 15B is a side perspective view of the smart glasses (100) worn on a users head illustrating the process of measuring the precise distance between the users eyes (801) and the glasses (602) lens displays (102) in order to accurately monitor the users eye motion and point of focus in relation to objects in the users field of view.

Figure 16A:
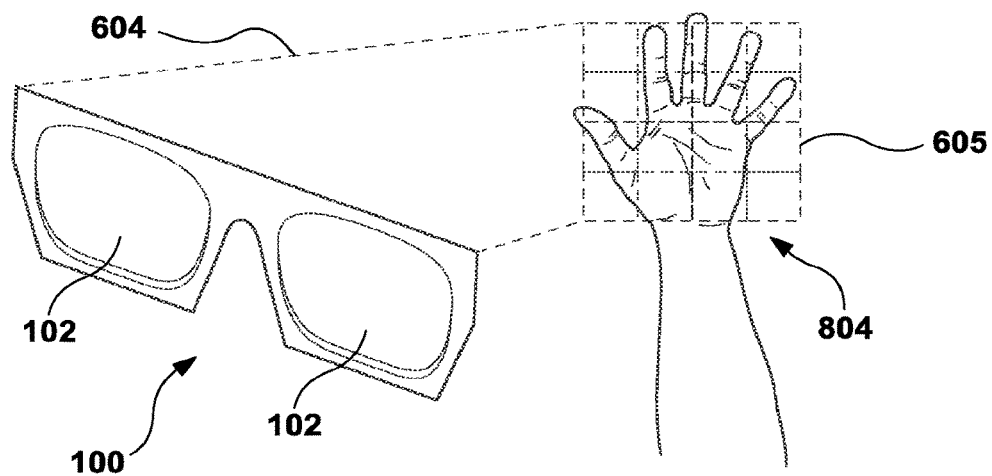
FIGS. 16A and 16B depict the ability of the smart glasses to map the area of a hand and assign sectors to it according to some embodiments.
Figure 16B:
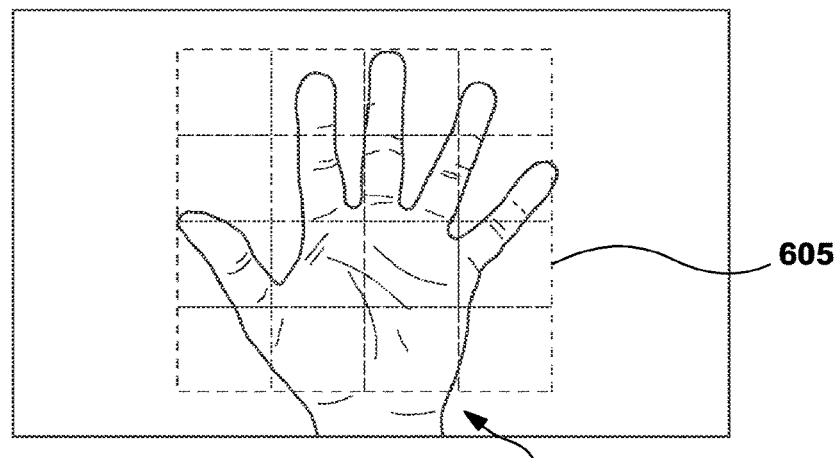

FIGS. 16A and 16B depict the ability of the smart glasses to map the area 605 of a hand 804 and assign sectors to it according to some embodiments. FIG. 16A is a perspective view of the smart glasses (100) using its infrared imaging (109) and optical mapping system to generate a 3D map (605) of the users hand (804). FIG. 16B is a perspective view of the 3D mapped (605) hand (804) which can be used to identify the user (800) and for gesture interfacing. Once the hand (804) has been identified the Smart glasses (100) will recognize the hand (804) as an interfacing device and monitor the hand (804) separately from the rest of the cameras field of view. One of the Smart Glasses (100) two POV cameras (105) may be assigned to monitor the hand (804) for gesture commands while the other camera may continue to capture the surrounding field of view or be controlled by gesture commands.

Figure 17A:
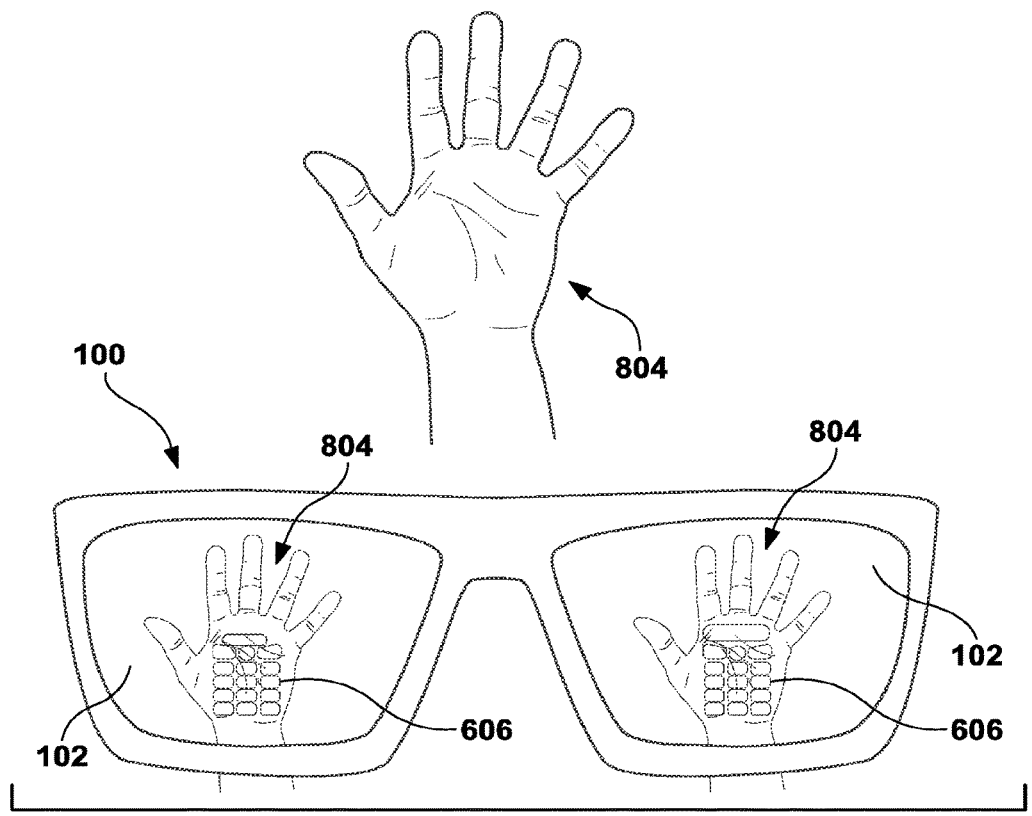
FIGS. 17A and 17B depict the ability of the smart glasses to project a virtual keypad onto a representation of the user's hand in the head-up display according to some embodiments.
Figure 17B:
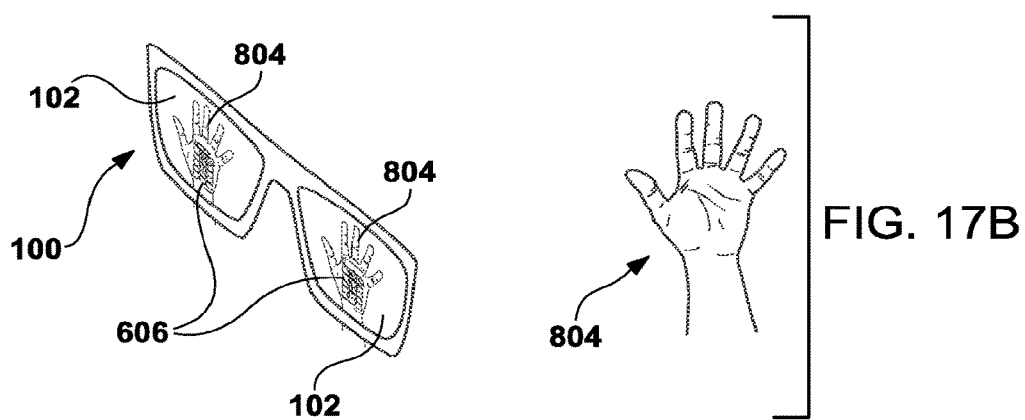

FIGS. 17A and 17B depict the ability of the smart glasses 100 to project a virtual keypad 606 onto a representation of the user's hand 804 in the head-up display according to some embodiments. FIG. 17A is a perspective view of the users hand and corresponding augmented content and virtual interface (606) mapped onto the hand in the smart glasses (101) left and right lens displays (102), illustrating the smart glasses mapping an interactive virtual graphic user interface (606), images and/or active or streaming media content onto a hand (804) or other object or surface in the users field of view. FIG. 17B is a perspective view of the smart glasses (101) augmenting a virtual graphic user interface (606) displayed in the left and right lens displays (102) and mapping that interface onto the users hand (804).

The user is able to then "click" on the "buttons" in this virtual keypad 606 in real space by touching the surface of the hand with a finger of the other hand or by sequentially focusing his or her eyes and momentarily pausing on each of the virtual buttons to be selected. The eye-tracking sensors can track eye movement and the forward-facing IR sensors and cameras can track hand movements for this purpose. The smart glasses do not need to project an actual image onto the hand in front of them, but this is also an option according to some embodiments.

Figure 18A:
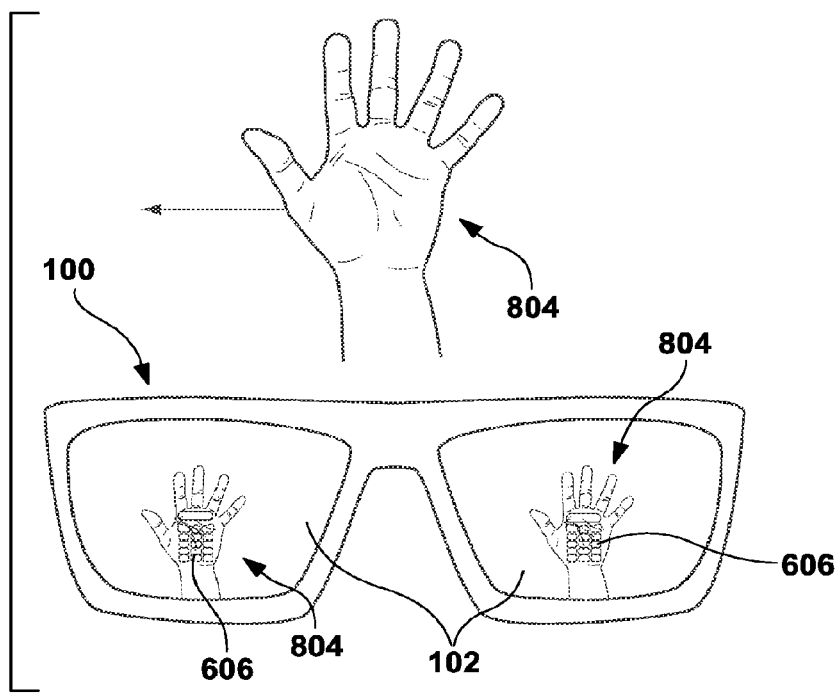
FIGS. 18A and 18B depict the ability of the smart glasses track the movement of the user's hand according to some embodiments.
Figure 18B:
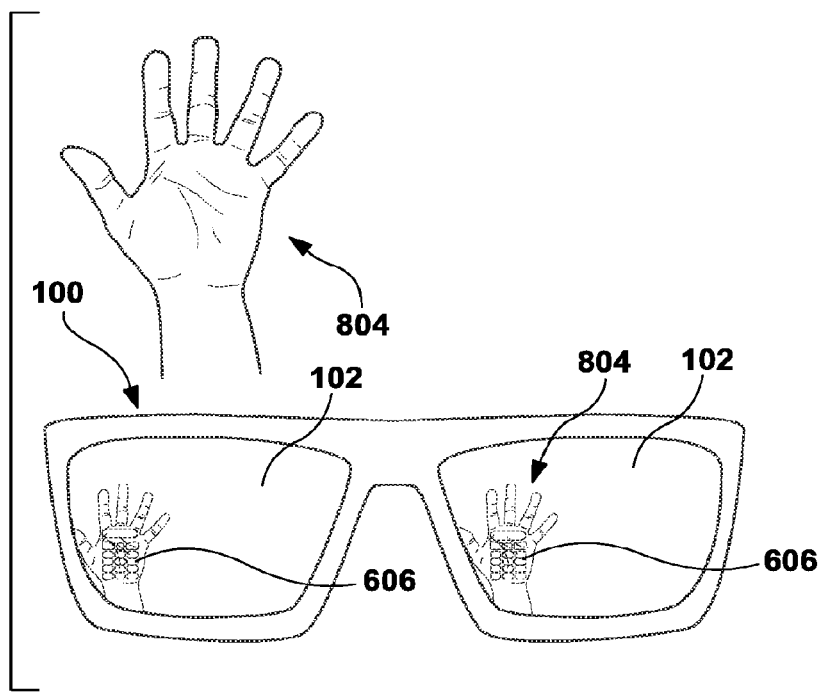

FIGS. 18A and 18B are perspective views of the smart glasses (101) according to some embodiments augmenting a virtual graphic user interface (606) displayed in the left and right lens displays (102) and mapping that interface onto the users hand (804). The smart glasses can dynamically and continuously alter the virtual mapped interface (606) to fit the dimensions and surface of the hand (804) based on the position and distance of the hand (804) to the smart glasses (804). The user can then interact with the augmented virtual interface (606) using gesture commands or hands-free eye and facial motion interfacing. The smart glasses 100 are configured to track the movement and dynamically update the position of the virtual keypad representation 606 of the user's hand 804 in the heads-up display.

Figure 19A:
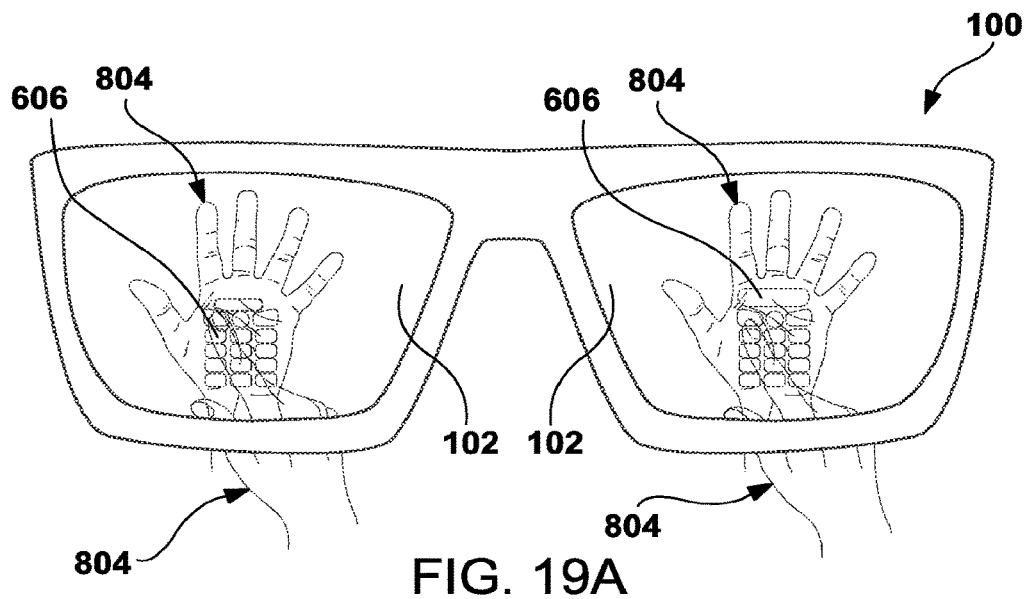
FIGS. 19A and 19B depict the user using his or her free hand to dial a phone number on a virtual keypad according to some embodiments.
Figure 19B:
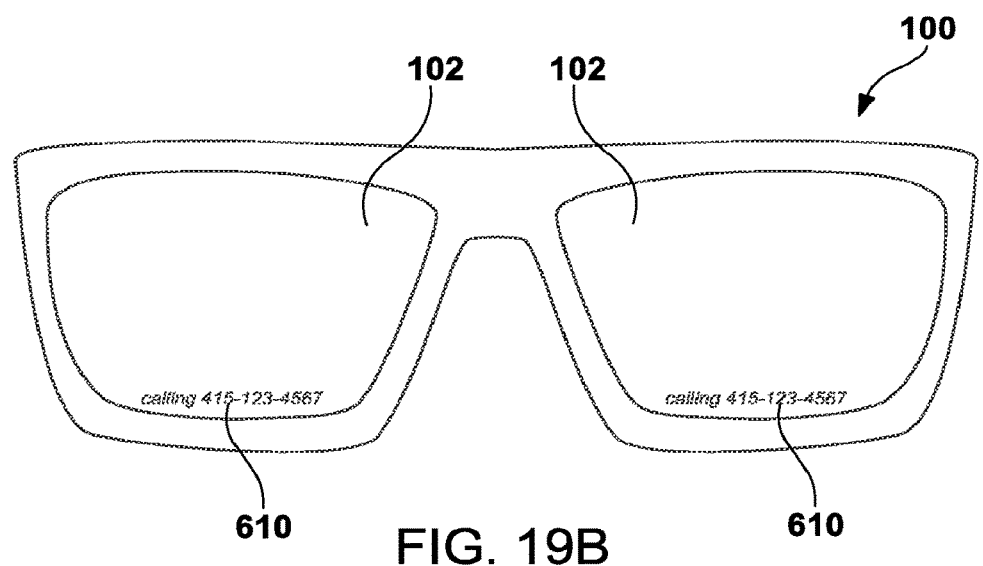
Figure 20A:
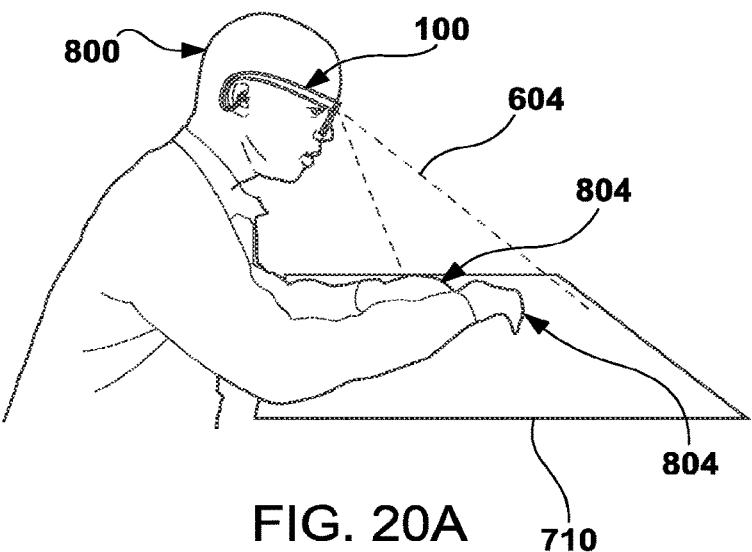
FIGS. 20A and 20B depict the ability of the smart glasses to project a virtual keyboard onto a representation of a surface according to some embodiments.
Figure 20B:
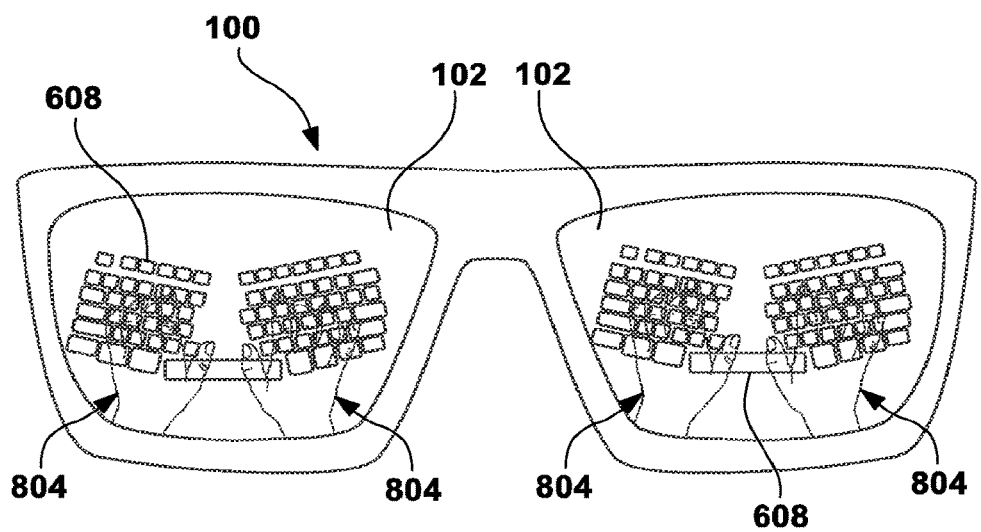

FIGS. 19A and 19B depict the user using his or her free hand to dial a phone number on a virtual keypad according to some embodiments. FIG. 20A is a perspective view of a user (800) wearing the Smart Glasses (100) and typing on a flat surface or table (710). Using Infrared imaging (604) the smart glasses (101) are able to map the surface and measure the distance and angle of the glasses to the target surface in order to accurately augment an interactive virtual keyboard (608) in the left and right lens displays (102) so that the user (800) sees a virtual keyboard (608) on the table (710). FIG. 20B is a perspective view of an interactive virtual keyboard (608) displayed in the smart glasses left and right lens displays (102) enabling the user to type on a table (710) or other surface without a physical keyboard and the smart glasses (101) are able to map the virtual keyboard (608) to the surface of the table (710) and monitor the users hand and finger motions enabling to type on any surface without the need for a physical keyboard.

The smart phones are configured to generate and project the virtual keypad 606 onto a representation of the user's hand in the head-up display. The heads-up display glasses then display the selected numbers as they are being called.

FIGS. 20A and 20B depict the ability of the smart glasses to project a virtual keyboard onto a representation of a surface according to some embodiments. The smart glasses 100 are configured to project 604 the representation 608 on surfaces 710 such as a desk or wall in front of the user. The smart glasses 100 are able to correctly adjust the virtual keyboard 608 to the distance and angle of the surface. The user's hands 804 can either been seen through the translucent heads-up display as they type, or the head's up display can project a video feed of the hands. FIG. 20A is a perspective view of a user (800) wearing the Smart Glasses (100) and typing on a flat surface or table (710). Using Infrared imaging (604) the smart glasses (101) are able to map the surface and measure the distance and angle of the glasses to the target surface in order to accurately augment an interactive virtual keyboard (608) in the left and right lens displays (102) so that the user (800) sees a virtual keyboard (608) on the table (710). FIG. 20B is a perspective view of an interactive virtual keyboard (608) displayed in the smart glasses left and right lens displays (102) enabling the user to type on a table (710) or other surface without a physical keyboard and the smart glasses (101) are able to map the virtual keyboard (608) to the surface of the table (710) and monitor the users hand and finger motions enabling to type on any surface without the need for a physical keyboard.

Figure 21A:
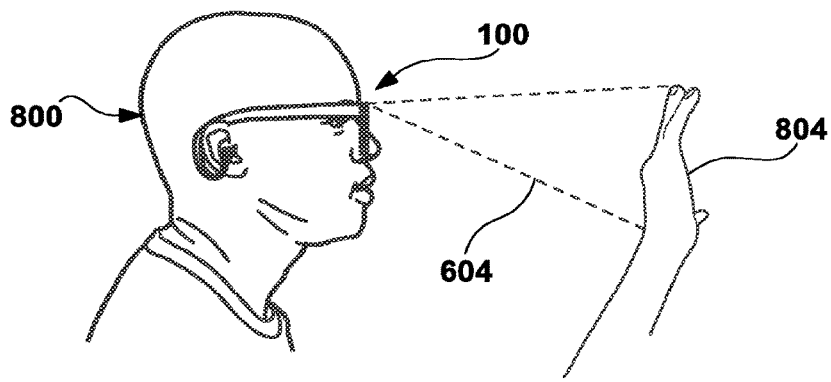
FIGS. 21A through 21C depict the ability of the smart glasses to detect hand movements and gestures according to some embodiments.
Figure 21B:
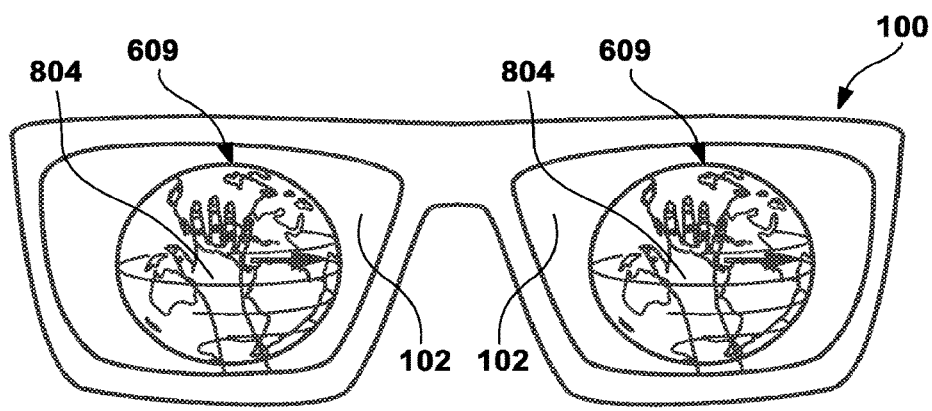
Figure 21C:
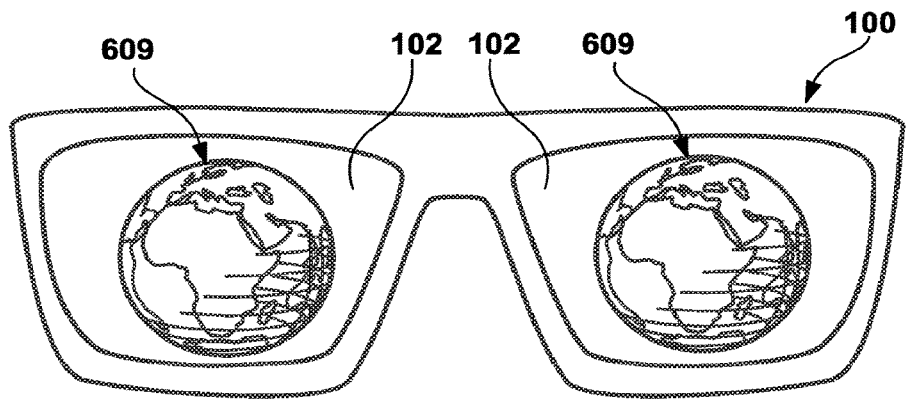

FIG. 21A through 21C depict the ability of the smart glasses to detect hand movements and gestures according to some embodiments. The smart glasses 100 are configured to detect movements and gestures so that the user can interact with virtual content that is displayed in the heads-up displays. In this depiction, the user is able to spin a representation of the earth 609 by turning his hand or by placing his hand 804 in position on the virtual globe as he sees it and spinning the globe. FIG. 21A is a perspective view of a user (800) wearing the smart glasses (100) and controlling an augmented or virtual 3D object or interface displayed in the left and right lens displays (102) and using infrared and optical mapping (604) the smart glasses (100) are able to continuously measure the distance and monitor the position of the users hands and fingers (804) in relation the virtual object or interface displayed in the glasses enabling the user to control augmented and virtual objects and interfaces displayed in the smart glasses heads-up display. FIG. 21B is a perspective view of the smart glasses left and right lens displays (102) and an augmented 3D image of a globe (609) being displayed in the lenses (102) and being rotated to the right by the user. The users hand (804) is visible through the transparent lens displays (102). FIG. 21C is a perspective view of the smart glasses left and right lens displays (102) and a virtual 3D image of a globe (609) being displayed in the lenses and being rotated to the right by the user. The users hand is no longer visible through the glasses when the left and right displays are in non-transparent virtual display mode.

Figure 22A:
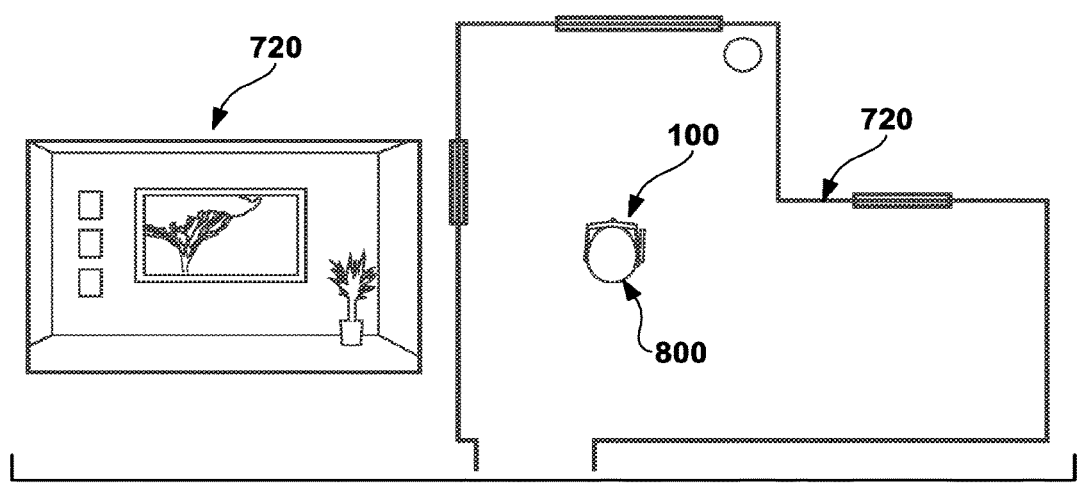
FIGS. 22A through 22C depict the ability of the smart glasses to add virtual representations of furniture to the head-up display according to some embodiments.
Figure 22B:
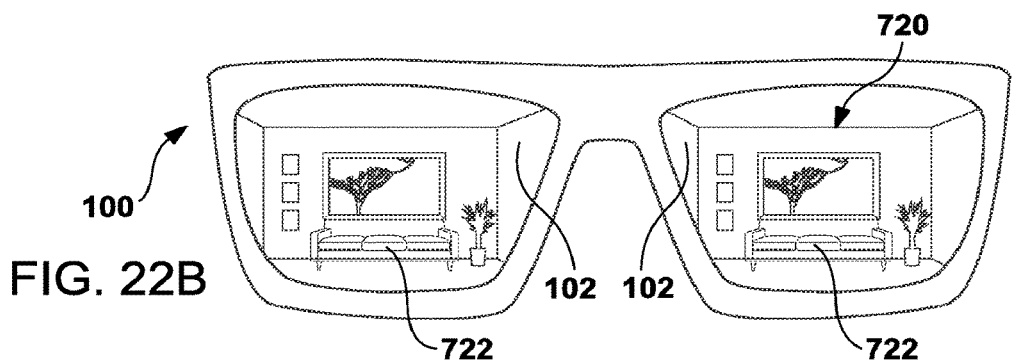
Figure 22C:
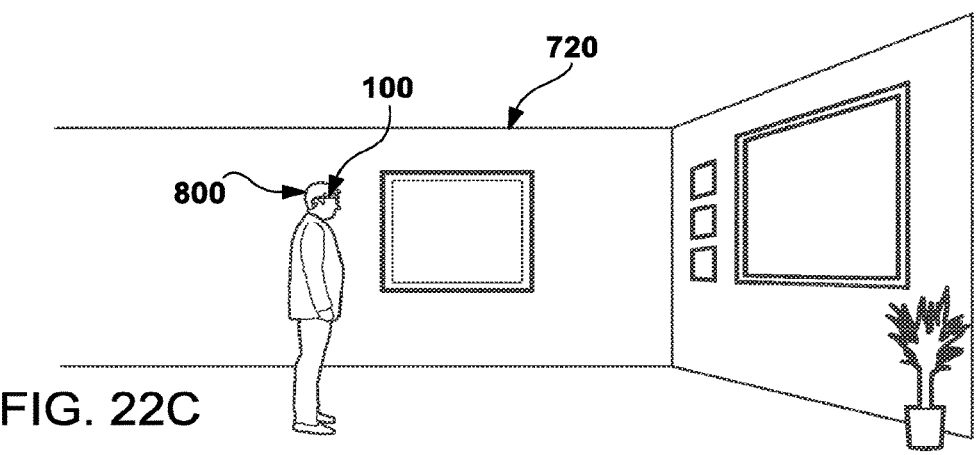

FIG. 22A through 22C depict the ability of the smart glasses to add virtual representations of furniture to the head-up display according to some embodiments. The smart glasses 100 are configured to add the representations such that the furniture 722 looks like it is in the a real environment 720 in front of the glasses. The user can use this to "try out" different furniture styles, colors and positions in a room to see how they will look. Virtual imagery of said furniture can be selected and downloaded by the user by using the head-up display glasses to browse through an Internet-based database of photographs or 3D models. FIG. 22A is an overhead view of a user (100) standing in the middle of a room (700) wearing the smart glasses with a second illustration of the users perspective view of the room (700). FIG. 22B is a perspective view of the smart glasses (100) left and right lens displays (102) from the perspective of the wearer. A virtual sofa (722) is augmented into the users view of the room (720). FIG. 22C is a perspective view of a user (800) wearing the smart glasses (100) and standing in the middle of a room (720) with a view of the room without the augmented virtual sofa seen through the smart glasses lens displays (102) as illustrated in FIG. 22B.

Figure 23A:
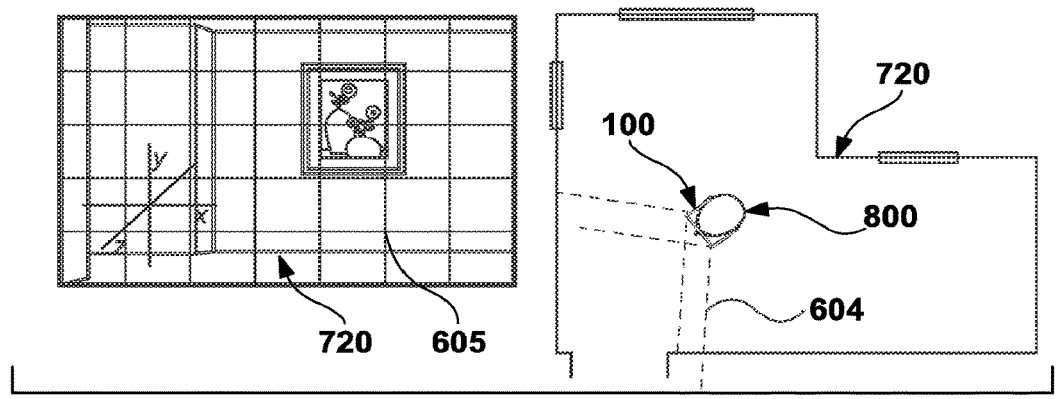
FIGS. 23A-23C and 24A-24B depict smart glasses being utilized for virtual representations according to some embodiments.
Figure 23B:
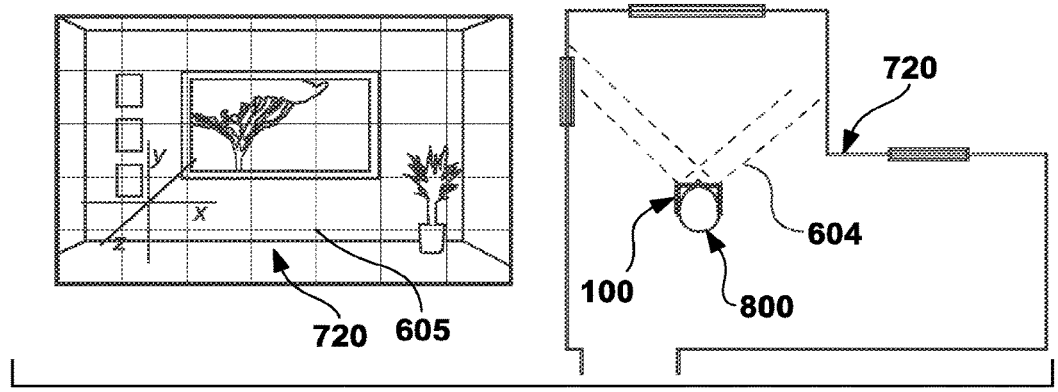
Figure 23C:
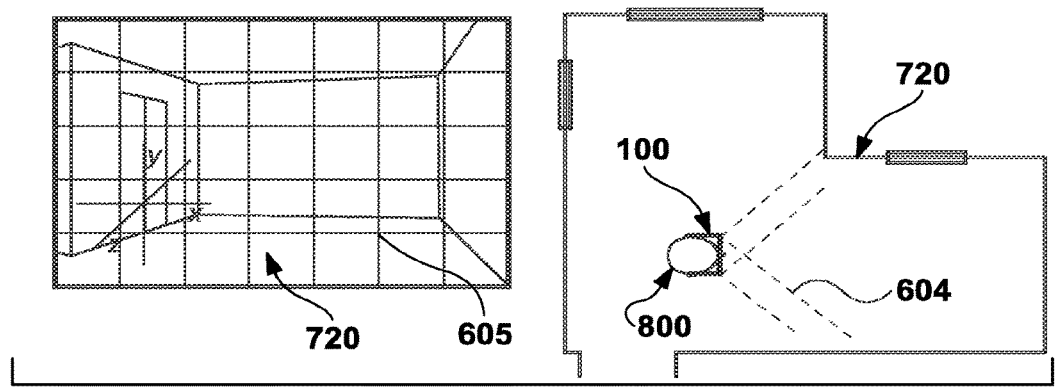
Figure 24A:
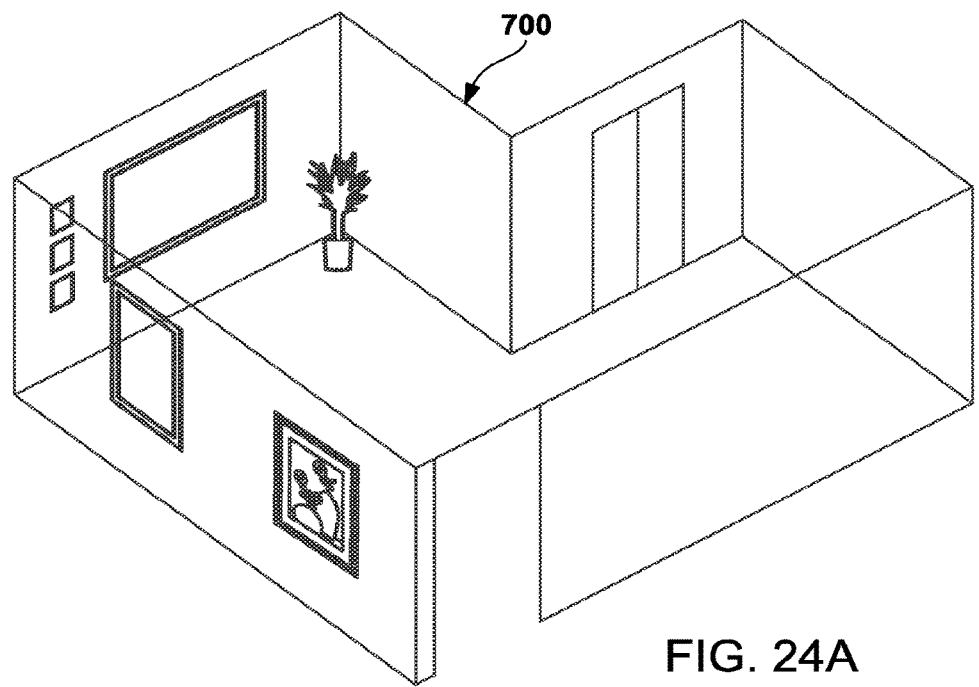
Figure 24B:
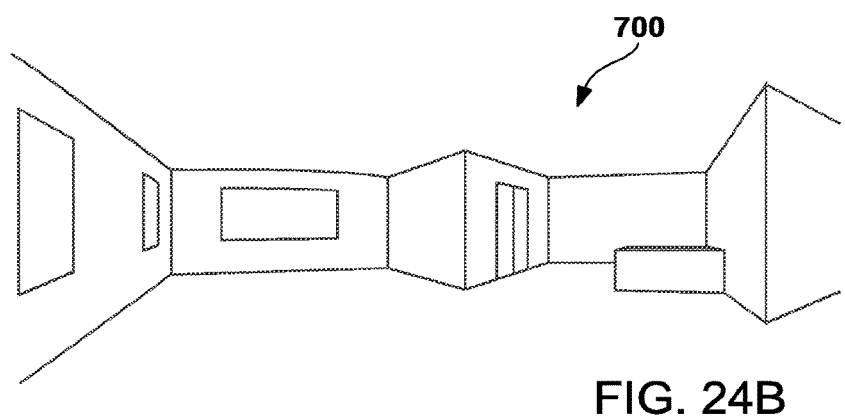

FIGS. 23A through 23C and 24A through 24B show further examples of the smart glasses in use. FIGS. 23A-23C are overhead and perspective views of a user wearing the smart glasses (100) and using the Infrared imaging and optical mapping system (605) to measure the distance to the walls and map all objects in the room (720) while using right and left cameras (105) to capture the a 3D color imaging of the room in order to generate a 3D model of the room (700). FIGS. 24A-24B are perspective views of a 3D model of a room (700) mapped by the smart glasses (100).

The embodiments discussed herein are illustrative of the present invention. As these embodiments of the present invention are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

What is claimed is:

1. An apparatus comprising
head-up displays glasses having a frame and lenses mounted on said frame;
a computer processor mounted on said head-up displays glasses;
a digital display, mounted in one or both of said lenses;
a digital projection system mounted on said head-up displays glasses, said digital projection system being operably connected to said computer processor;
a plurality of digital cameras mounted on said head-up displays glasses, said digital cameras being operably connected to said computer processor;
IR sensors and/or dual zoom cameras mounted on said head-up displays glasses and being configured to detect and track hand movements and gesture patterns at least one wearer's hand, or other object or surface, said IR sensors and/or said dual zoom cameras being operably connected to said computer processor;
wherein said computer processer being configured to determine at least one camera control hand gesture pattern and control an operation of at least one of said digital cameras, and
wherein said computer processer being further configured to control said digital display to at least in part display at least one camera feed from said digital cameras without a representation of the wearer's hand, or other object or surface, in said digital display; and
wherein said computer processer is configured to recognize said camera control hand gesture pattern and in response thereto dedicates at least one of said digital cameras to the detecting and tracking of the wearer's hand, or other object or surface, and further dedicates at least one other of said digital cameras for providing said camera feed without the representation of the wearer's hand, or other object or surface, in said digital display.

2. The apparatus of claim 1, wherein said computer processor being configured to recognize at least one other hand gesture pattern and in response thereto controls said digital projection system so as to project a graphical user interface onto a wearer's hand, or other object or surface, in said digital display, and wherein said IR sensors and/or dual zoom cameras are configured to track the movement of the wearer's hand, or other object or surface, and dynamically update a position of the graphical user interface in association with the representation of the wearer's hand, or other object or surface, in said digital display.

3. The apparatus of claim 2, wherein said apparatus further comprising:
dual inward-facing eye motion tracking sensors, integrated into said frame, for tracking a wearer's eye movements; and
motion sensors mounted on said head-up displays glasses and configured to detect head motion; and
wherein said processor being configured to activate a video scroll feature on said digital display in response to receiving head motion detection from said motion sensors.

4. The apparatus of claim 3, wherein said processor being configured to receive at least one signal from said IR sensors and/or said dual zoom cameras associated with said hand movements and gesture pattern or from said eye motion tracking sensors associated with the wearer's eye movements, said processor being further configured to interact said signal with said graphical user interface.

5. The apparatus of claim 4, wherein said processor being configured to dynamically and continuously alter said graphical user interface to fit at least one dimension and at least one surface of the wearer's hand, or other object or surface, based on a position and a distance of the wearer's hand, or other object or surface, in relation to said head-up displays glasses.

6. The apparatus of claim 2, wherein said plurality of digital cameras include dual forward-facing cameras, a left side-facing camera, a right side-facing camera and at least one rear-facing camera, said dual forward-facing cameras being configured for recording any one of wide angle, stereographic, 2D and 3D video or still image content, said plurality of digital cameras being configured for providing a 360 degree surround video feed around a wearer of said head-up displays glasses.

7. The apparatus of claim 1, wherein said plurality of digital cameras comprise extendable cameras, wherein said head-up displays glasses include arms and recessed tracks in said arms and wherein said extendable cameras and tracks are configured such that said extendable cameras are swivelable and bendable between a stored position in which said extendable cameras are stored in said recessed tracks when not in use and an operating position in which said extendable cameras are swiveled out from said tracks and bent in a desired orientation.

8. The apparatus of claim 1, further comprising at least one or any combination of gyroscopic motion sensor(s), accelerometer(s), global position system(s) mounted on said head-up displays glasses.

9. The apparatus of claim 8, wherein said processor is configured to determine at least one or any combination of motion orientation, spatial position and location of at least one of said plurality of digital cameras based on measurements from said at least one or any combination of said gyroscopic motion sensor(s), accelerometer(s), global position system(s).

10. The apparatus of claim 1, wherein said head-up display glasses are configured to provide mapping and gesture interfacing functions for interfacing with the projected graphical user interface.

11. The apparatus of claim 1, further comprising at least one or any combination of wireless, cellular and satellite communication devices mounted on said head-up display glasses.

12. The apparatus of claim 11, wherein said processor and devices have location, wide, local and/or personal area networking configurations and said head-up display glasses are configured to simultaneously engage in peer-to-peer networking and/or pairing with other modules and devices while connecting wirelessly to the Internet, calling and/or instantly connecting with one or more wireless devices and optionally streaming and/or receiving audio-video and location based data in real-time.

13. The apparatus of claim 1, wherein said head-up display glasses are configured to provide mapping and gesture interfacing functions for controlling the head-up display glasses and interfaces thereof.

* * * * *